(12) United States Patent
Pahalawatta et al.

(10) Patent No.: US 8,422,795 B2
(45) Date of Patent: Apr. 16, 2013

(54) QUALITY EVALUATION OF SEQUENCES OF IMAGES

(75) Inventors: Peshala V. Pahalawatta, Glendale, CA (US); Alexandros Tourapis, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 68 days.

(21) Appl. No.: 13/148,867

(22) PCT Filed: Feb. 11, 2010

(86) PCT No.: PCT/US2010/023823
§ 371 (c)(1),
(2), (4) Date: Aug. 10, 2011

(87) PCT Pub. No.: WO2010/093745
PCT Pub. Date: Aug. 19, 2010

(65) Prior Publication Data
US 2011/0311147 A1 Dec. 22, 2011

Related U.S. Application Data

(60) Provisional application No. 61/152,145, filed on Feb. 12, 2009.

(51) Int. Cl.
*G06K 9/68* (2006.01)
*G06K 9/48* (2006.01)

(52) U.S. Cl.
USPC .......................................... 382/218; 382/197

(58) Field of Classification Search .................. 382/197, 382/209, 218, 232, 236, 268, 269; 348/14.12, 348/402.1, 413.1; 375/240.12, 240.16
See application file for complete search history.

(56) References Cited

U.S. PATENT DOCUMENTS

| | | | |
|---|---|---|---|
| 5,446,492 A | 8/1995 | Wolf | |
| 5,592,226 A | 1/1997 | Lee | |
| 5,974,159 A | 10/1999 | Lubin | |
| 6,327,391 B1 * | 12/2001 | Ohnishi et al. | 382/236 |
| 6,704,451 B1 | 3/2004 | Hekstra | |
| 6,798,919 B2 | 9/2004 | Ali | |
| 6,822,675 B2 | 11/2004 | Jung | |
| 2003/0161399 A1 | 8/2003 | Ali | |
| 2003/0161406 A1 | 8/2003 | Lee | |
| 2004/0114817 A1 | 6/2004 | Jayant | |

(Continued)

FOREIGN PATENT DOCUMENTS

| CN | 1359235 | 7/2002 |
|---|---|---|
| CN | 101146226 | 3/2008 |

(Continued)

OTHER PUBLICATIONS

ANSI T1.801.03-2003, "American National Standard for Telecommunications—Digital Transport of One-Way Video Signals—Parameters for Objective Performance Assessment" pp. 1-50, published in 2003.

(Continued)

*Primary Examiner* — Daniel Mariam

(57) ABSTRACT

Quality evaluation or consistency computation of images is described. Disparity estimation is performed among images in one or more domains, and a metric based on the disparity estimation is computed to evaluate the quality or consistency.

19 Claims, 7 Drawing Sheets

U.S. PATENT DOCUMENTS

| | | |
|---|---|---|
| 2004/0190633 A1 | 9/2004 | Ali |
| 2005/0105802 A1 | 5/2005 | Hekstra |
| 2006/0045365 A1 | 3/2006 | De Haan |
| 2006/0098095 A1 | 5/2006 | Wittig |
| 2006/0104360 A1 | 5/2006 | Gordon |
| 2006/0268980 A1 | 11/2006 | Le Dinh |
| 2006/0276983 A1 | 12/2006 | Okamoto |
| 2007/0103551 A1 | 5/2007 | Kim |
| 2007/0237227 A1 | 10/2007 | Yang |
| 2007/0257988 A1 | 11/2007 | Ong |
| 2007/0263897 A1 | 11/2007 | Ong |
| 2007/0297516 A1 | 12/2007 | Lee |
| 2008/0143837 A1 | 6/2008 | Okamoto |
| 2008/0211917 A1 | 9/2008 | Kahan |

FOREIGN PATENT DOCUMENTS

| | | |
|---|---|---|
| JP | 11088915 | 3/1999 |
| JP | 2003204561 | 7/2003 |
| JP | 2006166130 | 6/2006 |
| JP | 2008124611 | 5/2008 |
| KR | 20030074041 | 9/2003 |
| WO | 0030366 | 5/2000 |
| WO | 0048407 | 8/2000 |
| WO | 0062556 | 10/2000 |
| WO | 02056596 | 7/2002 |
| WO | 02080563 | 10/2002 |
| WO | 2004054274 | 6/2004 |
| WO | 2006043500 | 4/2006 |
| WO | 2006099743 | 9/2006 |
| WO | 2007022803 | 3/2007 |
| WO | 2007066066 | 6/2007 |
| WO | 2007130389 | 11/2007 |
| WO | 2008106994 | 9/2008 |
| WO | 2008124744 | 10/2008 |

OTHER PUBLICATIONS

Girod, B., "What's Wrong with Mean-Squared Error?" Digital Images and Human Vision, A.B. Watson, ed., pp. 207-220, published in 1993.

Hekstra, A.P., et al., "PVQM—A Perceptual Video Quality Measure", Signal Processing: Image Communication, vol. 17, No. 10, pp. 781-798, published in Mar. 2002.

Lambrecht, et al., "Perceptual Quality Measure Using a Spatio-Temporal Model of the Human Visual System" Proc. of SPIE, vol. 2668, pp. 450-461, published in 1996.

Seshadrinathan, et al., "A Structural Similarity Metric for Video Based on Motion Models" IEEE Int. Conf. on Acoustics Speech and Signal Processing, vol. 1, pp. I-869-I-872, published in 2007.

Tourapis, A.M., et al., "Fast ME in the JM Reference Software" ISO/IEC JTC1/SC29/WG11 and ITU-T SG16 Q.6, Document JVT-P026, published in Jul. 2005.

Tourapis, et al., "Fast Motion Estimation Within the H.264 CODEC" Int., conf. on Multimedia and Expo, vol. 3, pp. 517-520, published in 2003.

Tourapis, A.M., et al., "Highly Efficient Predictive Zonal Algorithms for Fast Block-Matching Motion Estimation" IEEE Transactions on Circuits and Systems for Video Technology, vol. 12, No. 10, Oct. 2002, pp. 934-947.

VQEG, Final Report from the Video Quality Experts Group on the Validation of Objective Models of Video Quality Assessment, Phase I, published in Mar. 2000.

VQEG, "Final Report from the Video Quality Experts Group on the Validation of Objective Models of Video Quality Assessment, Phase II" published in Mar. 2003.

Wang, et al., "Image Quality Assessment: From Error Visibility to Structural Similarity", IEEE Transactions on Image Processing, vol. 13, No. 4, Apr. 2004.

Wang, et al., "Video Quality Assessment Based on Structural Distortion Measurement" Signal Processing: Image Communication, vol. 19, No. 2, pp. 121-132, Feb. 2004.

Watson, et al., "DVQ: A Digital Video Quality Metric Based on Human Vision" Journal of Electronic Imaging, vol. 10, No. 1, pp. 20-29, published in 2001.

Wolf, et al., "Video Quality Measurement Techniques" NTIA Report 02-392, Jun. 2002, pp. 1-113.

Ouni, et al., "Are Existing Procedures Enough? Image and Video Quality Assessment: Review of Subjective and Objective Metrics" Proceedings of the SPIE, vol. 6808, p. 68080Q-1-11, published on Jan. 27, 2008, USA.

Vranjes, et al., "Subjective and Objective Quality Evaluation of the H.264/AVC Coded Video" Systems, Signals and Image Procesing, 2008, 15th International Conference Jun. 25-28, 2008.

Gvozden, et al., "Comparison of H.264/AVC and MPEG-4 ASP Coding Techniques Designed for Mobile Applications Using Objective Quality Assessment Methods", 49th International Symposium ELMAR-2007, Sep. 12-14, 2007, Zadar Croatia.

Inazumi, et al., "Objective Measurement for Coded Video Quality Based on Camera Work and Frame Quality", Journal of the Institute of Image Information and Television Engineers, vol. 59, No. 3, pp. 435-438, published on Mar. 2005.

De Koning, et al., "Of MOS and Men: Bridging the Gap Between Objective and Subjective Quality Measurements in Mobile TV" Proc. of SPIE-IS&T Electronic Imaginge, SPIE vol. 6507, published in 2007.

Vranjes, et al., "Objective Video Quality Metrics" 49th International Symposium ELMAR 2007, Sep. 12-14, 2007, Zadar, Croatia, p. 45-9.

Meng, et al., "Objective Perceptual Video Quality Measurement Using a Foveation Based Reduced Reference Algorithm", IEEE, published in 2007, pp. 308-311.

Ozbek, et al., "Adaptive Inter-View Rate Allocation for Scalable Stereo Video Coding with an Objective Stereo Video Quality Measure" Signal Processing and Communications Applications, 2007, IEEE 15th.

ANSI T1 801-03-1996, "Digital Transport of One-Way Video Signals-Parameters for Objective Performance Assessment".

Okamoto, et al., "Study on Application of Video Quality Objective Assessment Technique" IEICE Society Conference, Sep. 2002.

Okamoto, et al., "Study on Improving the Performance of Video Quality Objective Assessment" IEICE Society Conference, Mar. 2003.

Javurek, Radim, "Efficient Models for Objective Video Quality Assessment" Radioengineering, vol. 13, No. 4, p. 48-50, published in Dec. 2004.

Ong, et al., "Perceptual Quality and Objective Quality Measurements of Compressed Videos" J. Visual CommunicationInstitution of Electrical Engineers, published in Aug. 2006, pp. 717-737.

Yang, et al., "A New Objective Quality Metric for Frame Interpolation Used in Video Compression" IEEE Transactions on Broadcasting, vol. 54, No. 3, Sep. 2008, p. 680-690.

Ahn, et al., "Objective Video Quality Measurement Using Various Degradation Factors" proceedings of the 5th WSEAS Int. Conf. on Signal Processing, Robotics and Automation, Madrid Spain, Feb. 15-17, 2006, pp. 351-355 (published in Mar. 2006).

Ozbek, et al, "Unequal Inter-View Rate Allocation Using Scalable Stereo Video Coding and an Objective Stereo Video Quality Measure" IEEE published in 2008, pp. 1113-1116.

Punchihewa, et al., "The Development of a Novel Image Quality Metric and a Synthetic Colour Test Image for Objective Quality Assessment of Digital Codecs", The Institution of Engineering and Technology, published in 2005.

Okamoto, et al., "Objective Video Quality Assessment Method for Video Streams Spatially Distorted by Coding and Packet Loss" The Institution of Engeering and Technology published in 2007.

Ozbek, et al., "Rate Allocation Between Views in Scalable Stereo Video Coding Using an Objective Stereo Video Quality Measure" ICASSP, published in 2007, p. I-1045-I-1048.

Fei, et al., "Objective Video Quality Assessment for Mobile Application" Wireless, Mobile and Multimedia Networks, 2006 IET International Conference, p. 1-4.

Pinson, et al., "An Objective Method for Combining Multiple Subjective Data Sets" SPIE Video Communications and Image Processing Conference, published in 2003.

Correia, et al., "Objective Evaluation of Video Segmentation Quality" IEEE Transactions on Image Processing, vol. 12, No. 2, Feb. 2003, pp. 186-200.

Martinez-Rach, et al., "A Study of Objective Quality Assessment Metrics for Video Codec Design and Evaluation" Proceedings of the 8th IEEE International Symposium on Multimedia, published in 2006, USA.

Oguz, et al., "Objective Image Quality Metrics for DCT-Based Video Compression" presented at the 36th SMPTE Advanced Motion Image Conference, published in Sep. 2002, pp. 385-392.

Wang, et al., "Objective Quality Evaluation of Digital Video" IEEE, published in 2000, pp. 791-794.

Yu, et al., "Human Visual System Based Objective Digital Video Quality Metrics" Proceedings of ICSP2000, published in 2000 pp. 1088-1095.

Caviedes, et al., "Impairment Metrics for Digital Video and Their Role in Objective Quality Assessment" Visual Communications and Image Processing 2000, Proc. SPIE 4067.

Corriveau, et al., "Video Quality Experts Group: The Quest for Valid Objective Methods" published in Human Vision and Electronic Imaging V, proc. of SPIE vol. 3959, San Jose, CA, 2000, p. 129-139.

Tan, et al., "A Multi-Metric Objective Picture-Quality Measurement Model for MPEG Video" IEEE Transactions on Circuits and Systems for Video Technology, vol. 10, No. 7, Oct. 2000, pp. 1208-1213.

Corriveau, et al., "VQEG Evaluation of Objective Methods of Video Quality Assessment" SMPTE Technical Conference No. 140, Sep. 1999, vol. 108, No. 9, pp. 645-648.

Grgic, et al., "Objective and Subjective Measurements for Video Compression System" International Coference on Software in Telecommunications and Computer Networks, conference date: Oct. 14-17, 1998.

Tan, et al., "An Objective Measurement Tool for MPEG Video Quality" Journal Signal Processing special Issue on Image and Video Quality Metrics Archive, vol. 70, Issue 3, No. 1998.

Cermak, et al., "Validating Objective Measures of MPEG Video Quality" SMPTE Journal, Apr. 1998.

Mitra, et al., "Special Issue on Objective Video Quality Metrics" Singal Processing Image Communication, 2004, vol. 19, p. 99-100.

Cotton, Bill, "A Two-Stage Objective Model for Video Quality Evaluation" Image Processing, 1996, vol. 1, p. 893-896.

Webster, et al., "An Objective Video Quality Assessment System Based on Human Perception" Proc. SPIE 1913, conference date: Feb. 1, 1993 in San Jose, CA on Human Vision, Visual Processing, and Digital Display IV.

Huang, et al., "Improvement and Implementation of Objective Digital Video Quality Measurement", published on Sep. 16, 2005, published by Beijing University of Posts and Telecommunications.

Cheng, et al., "Reference Free Objective Quality Metrics for MPEG Coded Video" Proceedings of SPIE-IS and T Electronic Imaging—Human Vision and Electronic Imaging X Published on Jul. 21, 2005.

Cheng, et al., "Reference-Free Objective Quality Metrics for MPEG-Coded Video" SPIE 5666, conference date: Jan. 17, 2005 in San Jose, CA.

Lee, et al., "Edge Degradation for Objective Video Quality Metrics" Proc. SPIE 5308, conference on Jan. 20, 2004, San Jose, CA, Visual Communications and Image Processing 2004.

Corriveau, et al., "The Video Quality Experts Group Evaluates Objective Methods of Video Image Quality Assessment" proc. 140th SMPTE Technical Conference and Exhibit, Oct. 28-31, 1998, Pasadena Convention Center, California.

Gastaldo, et al., "Objective Assessment of MPEG-2 Video Quality" Journal of Electronic Imaging v. 11, No. 3, Jul. 2002, p. 365-374.

Beerends, et al., "Objective Measurement of Video Quality" Symposium on Information Theory in the Benelux, published date May 1997, p. 81-88.

Olsson, et al., Objective Methods for Assessment of Video Quality: State of the Art, IEEE Transactions on Broadcasting issued on Dec. 1997, vol. 43, No. 4, pp. 487-495.

Yang, et al., "Objective Quality Metric Based on Spatial-Temporal Distortion" Multimedia and Information Technology 2008, International Conference on IEEE, Piscataway, NJ, USA, Dec. 30, 2008, pp. 813-816.

Li, et al., "Video Quality Assessment by Incorporating a Motion Perception Model" Image Processing 2007, IEEE International Conference on Sep. 1, 2007, pp. II-173.

Boev, et al., "Towards Compound Stereo-Video Quality Metric: a Specific Encoder-Based Framework" Image Analysis and Interpretation, 2006, Mar. 26-28, 2006, Piscataway, NJ, USA, pp. 218-222.

Lee, et al., "Objective Video Quality Assessment" Optical Engineering 45(1) Jan. 2006, vol. 45(1), p. 17004-1-11, publisher: SPIE.

Okamoto, et al., "Proposal for an Objective Video Quality Assessment Method that Takes Temporal and Spatial Information Into Consideration" first published Jun. 15, 2006, vol. 89, Issue 12, pp. 97-108.

Oh, et al., "Disparity Estimation and Virtual View Synthesis from Stereo Video" 2007 IEEE International Symposium on Circuits and Systems, p. 4, published in 2006 in USA.

Hewage, et al., "Prediction of Stereoscopic Video Quality Using Objective Quality Models of 2-D Video" Jul. 31, 2008, vol. 44, No. 16, The Institution of Engineering and Technology.

Zhang, et al., "Adaptive Reconstruction of Intermediate Views from Stereoscopic Images" IEEE Transactions on Circuits and Systems for Video Technology, vol. 16, No. 1, p. 102-13, Jan. 2006.

Yao, et al., "Objective Quality Assessment for Compressed Video" Proceedings of the 2003 IEEE International Symposium on Circuits and Systems, part vol. 2, p. II-688-91, vol. 2, published in 2003 in USA.

Wang, et al., "Multiview Video Sequence Analysis, Compression, and Virtual Viewpoint Synthesis" IEEE Transactions on Circuits and Systems for Video Technology, vol. 10, No. 3, Apr. 2000, p. 397-410.

Eisenberg, et al., "Quality Metrics for Measuring the End-to-End Distortion in Packet-Switched Video Communication Systems" proc. of the SPIE—The International Society for Optical Engineering, vol. 5292, No. 1, p. 162-73, 2004.

Velasco, et al., "Metrics for the Objective Quality Assessment in High Definition Digital Video" Conference: Signal processing, pattern recognition, and applications; IASTED-International Conference, Feb. 5, 2008.

Tan, Kwee Teck, "Objective Picture Quality Measurement for MPEG-2 Coded Video" Thesis, 2001.

* cited by examiner

QUALITY EVALUATION OF SEQUENCES OF IMAGES

CROSS-REFERENCE TO RELATED APPLICATIONS

This application claims priority to U.S. Patent Provisional Application No. 61/152,145, filed 12 Feb. 2009, which is hereby incorporated by reference in its entirety.

TECHNOLOGY

The present disclosure relates to image quality evaluation. More in particular, embodiments of the present invention relate to quality evaluation of sequences of images.

BACKGROUND

Quality evaluation is useful for improving the user experience in many multimedia applications. Generating objective quality metrics that can accurately estimate the perceived quality of image sequences may promote quality evaluation.

Quality evaluation may be used with some multimedia applications. Such applications include video compression, pre-processing, post-processing, and watermarking among others. In video compression, encoding techniques may use video quality metrics to improve encoding parameters through rate distortion optimization, and pre-processing techniques rely on video quality metrics to optimize pre-processing filter parameters given a target application or environment. In video post-processing, content is adapted to be displayed on a variety of display types at various spatial and temporal resolutions, and the resulting video quality may be evaluated for each display type. In watermarking, video quality metrics can be used to minimize the perceivable distortion due to the watermark when embedding a watermark, or could be considered when detecting and/or deciphering the embedded watermark signal.

One approach to quality measurement is to perform subjective tests. However, such tests may incur some difficulty and expense to setup. Developing objective image and quality metrics that can provide quality ratings to approach those obtained using subjective tests (see references [1], [2] incorporated herein by reference in their entirety). Currently, however, in spite of such difficulty or expense (see reference [3] incorporated herein by reference in its entirety), most in the video compression community continue to use MSE (Mean Squared Error) and PSNR (Peak Signal-to-Noise Ratio) as distortion metrics. Recently, the considerable interest in new applications, such as 3D/stereo video delivery, has renewed the interest in the creation of better and more accurate metrics that better model the human visual system.

The distortion introduced to video through compression, pre/post processing, etc., can be both spatial and temporal in nature. In multi-view video, cross view/stereo distortion may also be introduced. Spatial distortions include such compression artifacts as quantization, blocking, blurring, and ringing artifacts among others. Spatial distortion metrics have been extensively investigated in the image quality evaluation community but the effects of temporal and multi-view distortion are much less well known. Such distortions lead to temporal or/and view inconsistencies in the resulting video.

Early attempts at accounting for temporal distortion in objective perceptual quality metrics consider a temporal contrast sensitivity function to determine the perceivable differences in the temporal domain of the sequence (see references [4], [5], [6] incorporated herein by reference in their entirety). These methods, however, do not account for motion in the sequences, and as such, do not completely measure the perceived temporal consistency of the sequences. Similarly, for stereo images, stereo view disparity among views is not considered.

Other objective quality metrics such as those shown in references [7], [8], incorporated herein by reference in their entirety, measure the temporal consistency of the sequence by measuring the pixel differences or correlation between successive images in the sequence. However, they do not perform motion estimation prior to the measurement, and again, may not adequately estimate the true temporal consistency of the sequence.

In reference [11], incorporated herein by reference in its entirety, the well-known structural similarity image quality metric (see reference [9] incorporated herein by reference in its entirety), was extended to the video domain by introducing a global weighting scheme based on the amount of motion in each image of the sequence. However, the method ignores the relationship between temporal consistency and quality. A more sophisticated motion compensated structural similarity metric was proposed in reference [10], incorporated herein by reference in its entirety. However, the proposed technique relies on optical flow computation, which may be complex to implement and cannot be used in image regions containing significant motion.

BRIEF DESCRIPTION OF THE DRAWINGS

The accompanying drawings, which are incorporated into and constitute a part of this specification, illustrate one or more embodiments of the present disclosure and, together with the detailed description and the examples, serve to explain the principles and implementations of the disclosure.

FIGURE (FIG. 1 shows an embodiment of the quality evaluation systems and methods according to the present disclosure.

DESCRIPTION OF EXAMPLE EMBODIMENTS

Overview

Figure 1:
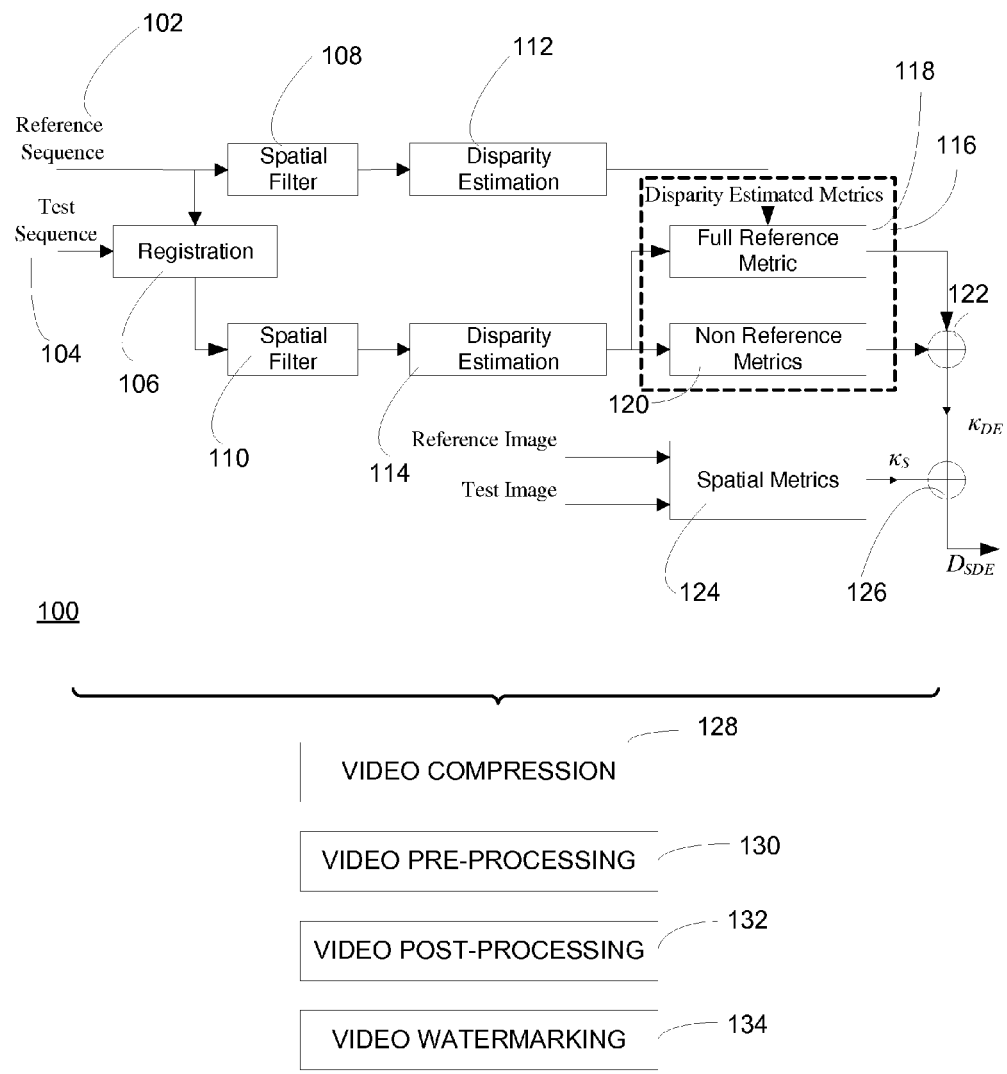

Embodiments of the present invention relate to quality evaluation of sequences of images. A quality evaluation method for evaluation of a sequence of images is provided, comprising: performing disparity estimation among images in one or more domains to generate disparity vectors; and computing a metric based on the disparity vectors to evaluate the quality.

In an embodiment, a system for computing consistency of a test image sequence is provided, comprising: a disparity estimator, to estimate disparities among images of the test image sequence or disparities between images of the test image sequence and images of a reference image sequence through generation of disparity vectors; a metric calculator, to compute the consistency of the test image sequence as a function of the disparity vectors generated by the disparity estimator.

Further example features of example embodiments of the present disclosure are described in the specification, drawings, claims and abstract of the present application According to some embodiments of the present disclosure, novel systems and methods for computing the temporal and/or multi-view consistency of an image sequence are disclosed. Unlike existing schemes, disparity estimation methods are used, such as a block based motion estimation algorithm like the Enhanced Predictive Zonal Search (EPZS) (see references [12], [13], [14] incorporated herein by reference in their entirety) to track the movement of pixel regions within the image and computes the consistency of the sequence after disparity, e.g. motion and illumination change, compensation. Stereo view disparity can consider similar methods for analysis.

In accordance with some of the embodiments of the present disclosure, temporal (e.g. motion) or/and view disparity, and disparity compensated pixel information (also including deblocking, for example), are used to measure the consistency of temporal and multi-view features between images of a sequence, as well as the consistency of the features in a test sequence relative to a reference sequence. The techniques and embodiments discussed in the present disclosure also apply to images in a bitstream mode.

Any existing disparity estimation technique, such as any block based motion estimation algorithm, with or without illumination compensation support, can be used for this purpose, and the accuracy of the metric will depend on the accuracy of the disparity estimation method used. Overlapped block motion estimation can also be used in order to avoid spurious results on block edges.

In addition, example embodiments of metrics are described that can take into account different aspects of temporal and/or multi-view quality. A first embodiment is a full reference metric that can measure the consistency of the disparity vectors computed during the disparity estimation process for the reference and test sequences. Other two embodiments are non reference metrics that can measure the consistency of pixel values across successive disparity compensated images of the test sequence.

Therefore, the present disclosure describes a set of temporal and stereo/multi-view consistency metrics to help measure the extent of temporal and/or multi-view distortion artifacts in video sequences. According to some embodiments, the metrics according to the present disclosure perform disparity, e.g. motion, estimation in the input sequences, and measure the temporal consistency in the disparity compensated images of the sequence. Similarly, for multi-view metrics, the consistency in "cross-view" compensated images can be evaluated. In some embodiments, global and local weighting parameters can be used to ensure that only the perceivable distortions will be measured by the metrics. In some embodiments, a perceptual weighting scheme is also included to take into account global events such as scene transitions, such as cuts, fades, and cross-fades, in the sequence, as well as local properties, such as texture, object and image edges among others.

The temporal/multi-view features can be further combined with existing or new spatial distortion metrics for better characterization of the overall distortion of the video sequence.

Among the likely distortion types that can occur in these domains are:
1) Flicker—In video compression, for example, flicker can be caused by encoding different pictures at different quality (e.g., varying quantization parameters due to rate control). Flicker is especially pronounced during all intra coding, or coding of only I and P coded pictures, especially in the presence of periodic intra refresh images. Flicker can also occur, for example, as a consequence of the capture process, frame rate conversion, etc;
2) Motion Inconsistency—Motion inconsistencies can occur due to incorrect motion estimation and the quantization of motion vectors during the encoding process. In stereo video, motion inconsistencies can be further aggravated due to the nature of the video content. Motion inconsistency can also occur, for example, due to camera instability;
3) Mosquito Noise—Mosquito noise is caused by temporally varying aliasing artifacts near sharp edges in the image. This, too, can be aggravated in stereo video, especially if the stereo views are multiplexed during the encoding process and demultiplexed prior to display;
4) Spatio-Temporal and Spatio-Temporal-Stereo view aliasing; and
5) Stereo view inconsistency—Similar to motion inconsistencies, stereo view inconsistencies can occur due to prediction inconsistencies/changes from one view to another. Stereo view inconsistencies may also occur due to camera misalignments or differences in the camera sensor.

According to some embodiments, two image sequences, a reference sequence, and test sequence are taken as inputs. As used herein, the terms "2D" and "3D" respectively refer to the phrases "two dimensional" and "three dimensional." The sequences can undergo an initial registration step which ensures that the test sequence is properly aligned (temporally, 2D spatially, and for stereo images, 3D spatially) with the reference sequence. This step could also include other operations such as resolution/aspect ratio conversion, gamma correction, etc., that adapt the inputs to particular display conditions. As also mentioned below with reference to FIG. 1, registration can be performed by registering the test image sequence with the reference image sequence or, alternatively, by registering the reference image sequence with the test image sequence. Moreover, both types of registration can also be performed and their results combined.

The sequences can then be low-pass filtered to reduce noise, and then for each image of each sequence, disparity estimation (e.g., motion estimation and/or illumination parameter estimation) is performed to find the prediction images from past and future neighboring images. Similar analysis can be performed across views in stereo image pairs. Temporal or/and stereo view consistency metrics can then be calculated using the disparity vectors and/or prediction images as input. Finally, the different consistency metrics can be combined together using different weighting parameters to generate a combined disparity metric that accounts for temporal and/or stereo view consistencies. This combined metric can then be further combined with other metrics such as other temporal, stereo view, frequency, or spatial metrics finally providing a combined spatio-temporal-stereo view distortion metric.

The above described embodiments can be better understood with reference to the example pictorial representation of FIG. 1.

As shown in block diagram 100 of FIG. 1, provided as inputs are two image sequences (a reference image sequence 102, $f_n^r$, and a test image sequence 104, $f_n^t$) suitable for the computation of a full-reference quality metric 118, or one image sequence 104, $f_n^t$, suitable for the computation of a non-reference quality metric 120, where n denotes the image index in the sequence. By way of example, the sequences 102 and 104 can comprise stereo video pairs if evaluation of the quality of stereo video is desired.

In accordance with the present disclosure, a full-reference quality metric like metric 118 of FIG. 1 provides an estimate of the distortion of the test sequence 104 relative to the reference sequence 102 while non-reference metrics like metrics 120 of FIG. 1 provide a "blind" estimate of the distortion of the test sequence 104.

With continued reference to FIG. 1, the test sequence 104 is registered 106 with the reference sequence 102, and both sequences 102, 104 are spatially filtered 108, 110. For example, spatial filtering 108, 110 can comprise a low-pass filter that reduces noise in the images and helps to improve the accuracy of disparity estimation. Disparity estimation of the reference sequence and test sequence is then performed in blocks 112, 114. As later explained in more detail with reference to FIG. 2, disparity estimation 112, 114 can include, for example, motion estimation and/or illumination change estimation or, more generally, disparity estimation among images in one or more domains D1 . . . Dm.

Registration 106 can be performed by registering the test image sequence with the reference image sequence or, alternatively, by registering the reference image sequence with the test image sequence. Moreover, both types of registration can also be performed and their results combined.

Disparity estimated metrics 116 based on the operations performed in 112, 114 are then computed. As mentioned above, metrics 116 can include, for example, a full reference metric 118 or one or more non reference metrics 120.

If needed, metrics 118 and 120 can be combined 122. Moreover, one or more spatial metrics (or, more generally, metrics in one or more additional domains also inclusive, if desired, of a frequency domain) can also be computed 124 (e.g., with methods known in the art) and then combined with the combined metrics 122. For example, output metrics $D_{SDE}$ at the output of the system shown in FIG. 1 can include one or more of temporal, spatial, and/or multi-view quality metrics.

As mentioned above, the methods and systems shown in FIG. 1 can be used, for example, in several processes or systems, such as a video compression process or system 128, a video pre-processing process or system 130, a video post-processing process or system 132, or a video watermarking process or system 134.

Figure 2:
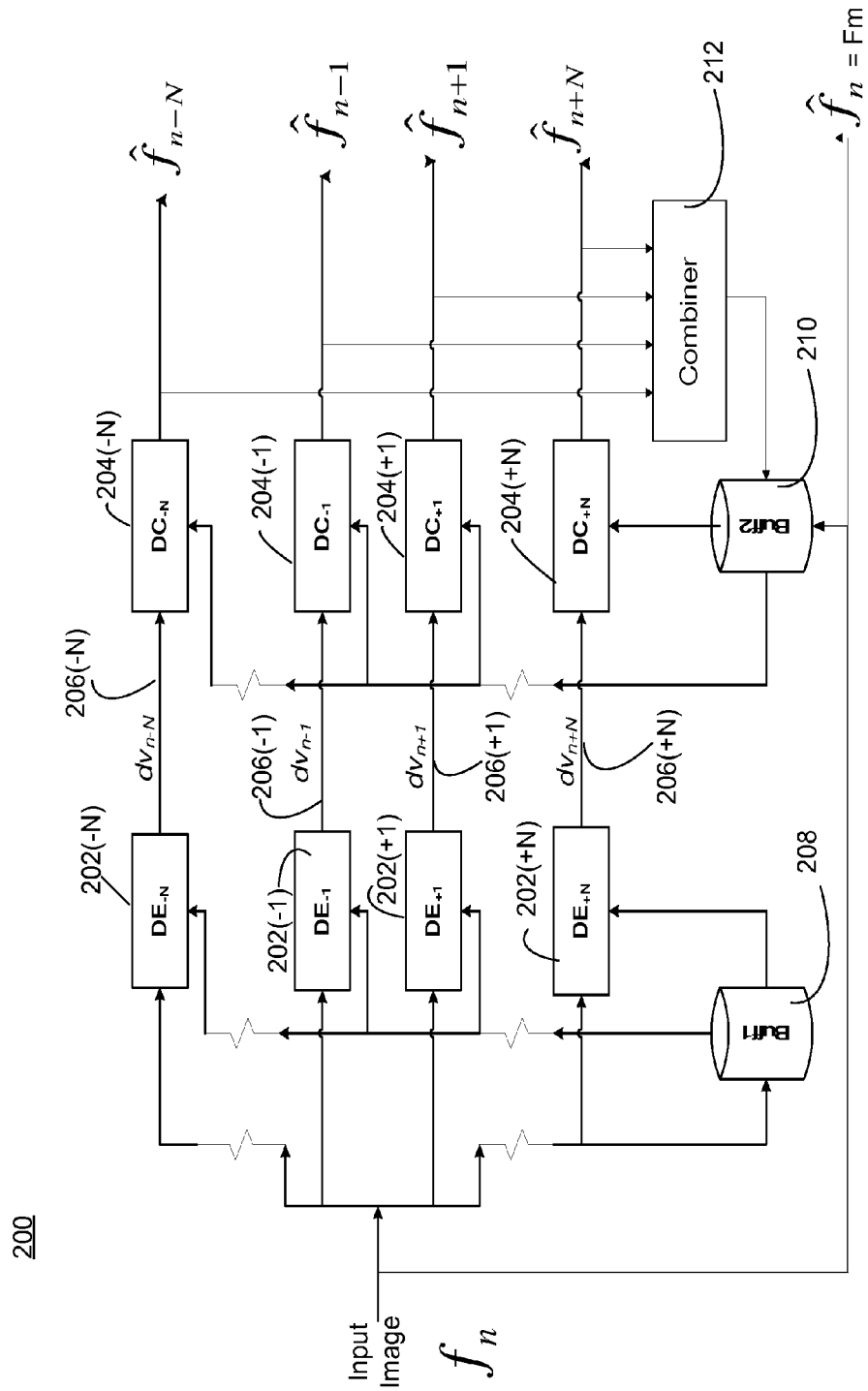
FIG. 2 shows in more detail an embodiment of the disparity estimation block of FIG. 1.

FIG. 2 provides an embodiment of the disparity estimation blocks 112 and 114 of FIG. 1, where an additional compensation process can also be taken into account, if desired. As already mentioned above, disparity can be estimated with reference to one or more domains, such as time (motion) or brightness (illumination change).

In the case of the disparity estimation involving a motion estimation (ME) process, temporally adjacent neighboring images, both past and future, of each input image of the test sequence or reference sequence can be considered, and the motion vectors that provide the best match to the input image be correspondingly estimated. Typically, the matches are found on a fixed or adaptive block basis (e.g., 8×8 blocks of pixels) but other sizes as well as shape based methods can also be used for this purpose. Motion estimation methods per se are known to the person skilled in the art and will not be described here in detail. Any kind of motion estimation could be used with the teaching of the present disclosure, also including, for example, overlapped and non-overlapped block motion estimation, affine motion estimation, parabolic and parametric among others.

In the case of illumination change characteristics, a possible disparity estimation method is the Enhanced Predictive Zonal Search (EPZS) and its Multidimensional Extensions (e.g. N-D EPZS). Other methods such as methods based on optical flow, can also be considered.

Using the estimated disparity information, e.g. motion vectors, for each neighboring image, a motion compensation process (MC) forms a reconstructed image, where the reconstructed image is a prediction of the input image given the corresponding neighbor. Motion compensation processes per se are known to the person skilled in the art and will not be described here in detail. Similar characteristics can be considered for disparity estimation across multiple views.

As shown in FIG. 2, where a disparity estimation and compensation arrangement 200 is depicted, N past and N future spatially filtered neighbors of a filtered input image $f_n$ can be used, by way of example, in the disparity estimation process described above. The person skilled in the art will understand that alternative embodiments are also possible, where only past neighbors, only future neighbors, or a number of past neighbors different from the number of future neighbors can be used.

The notations $\hat{f}_{n-N}, \ldots, \hat{f}_{n-1}, \hat{f}_{n+1}, \ldots, \hat{f}_{n+N}$ of FIG. 2 indicate reconstructed images corresponding to each neighbor, $f_{n+i}$, such that the pixel value at each location, s, in $\hat{f}_{n+i}$ corresponds to the value at pixel location s-$dv_{n+i}$(s) in $f_{n+i}$, where s is a vector containing the horizontal and vertical co-ordinates of the pixel, and $dv_{n+i}$(s) is the disparity vector estimated by the disparity estimation process. More in particular, as shown in FIG. 2, for each neighbor n±i, disparity estimation is calculated in blocks 202(±i) and disparity compensation based on the disparity vectors 206(±i) at the output of blocks 202(±i) is calculated in blocks 204(±i).

Each disparity estimation block 202(±i) receives as inputs the input image $f_n$ and the past or future neighbor image $f_{n+i}$. The neighbor images can be stored in a first buffer 208. Similarly, each disparity compensation block 204(±i) receives as inputs the disparity vector 206(±i) and the past or future neighbor image $f_{n+i}$. The neighbor images can be stored in the first buffer 208 or in a second buffer 210, as shown in FIG. 2. Moreover, the second buffer 210 can also store the combined outputs of the disparity compensation blocks 204(±i) (see combiner 212), in order to allow future disparity compensations to also depend on the result of previous disparity compensations.

Figure 3:
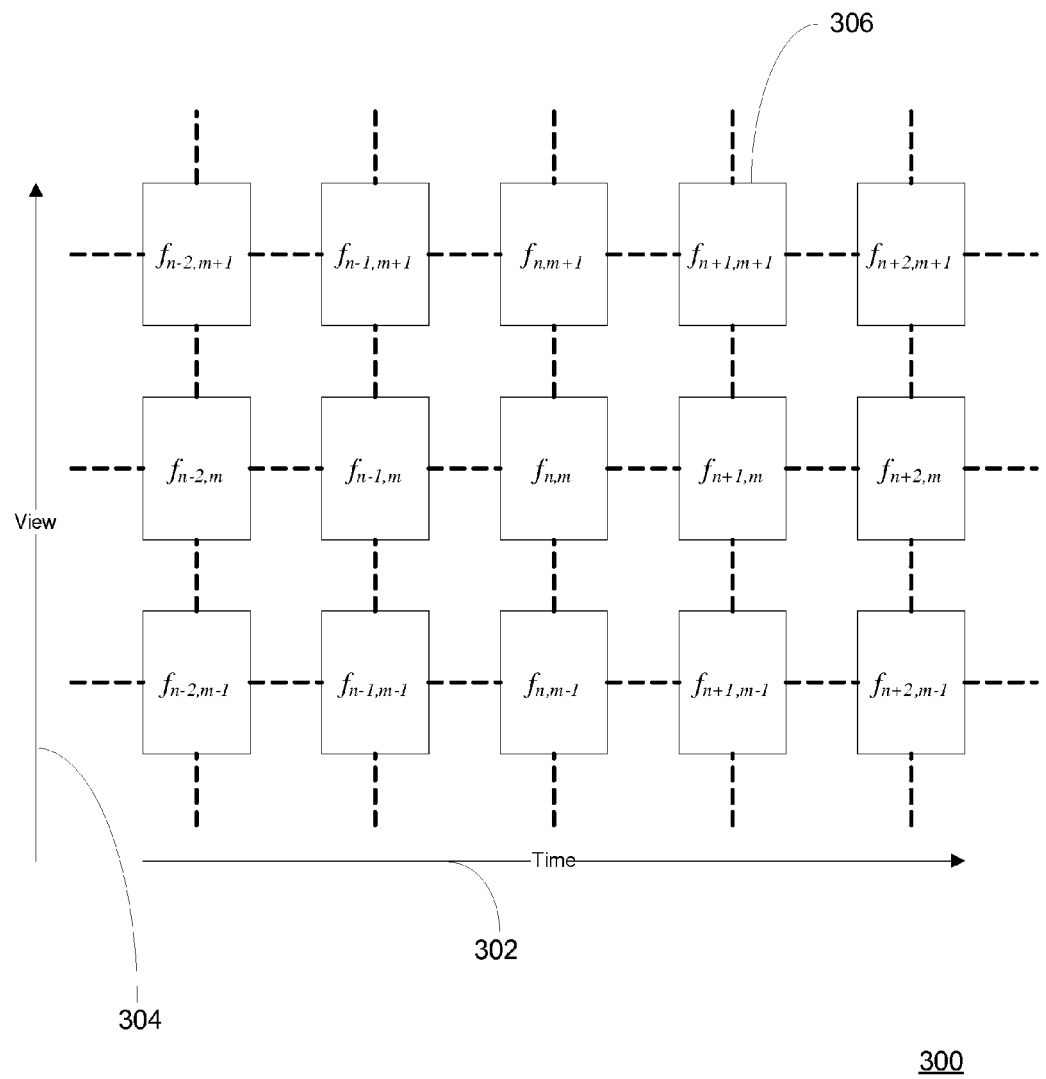
FIG. 3 shows an adaptation of the scheme of FIG. 2 to a multi-view environment.

FIG. 3 shows an adaptation of the embodiment of FIG. 2 to a multi-view case, where a plurality of estimation (or estimation and compensation) blocks 300 is illustrated. In particular, the same terminology of FIG. 2 can be applied to the multi-view case shown in FIG. 3 by assuming that one view is at position m, and the other views are at positions m±j where j represents a spatial or viewing angle distance from the first view. For example, block 306 of FIG. 3 represents processing of the input sequence of view m+1 at time n+1.

The disparity estimation process provides as output the set of reconstructed images and the corresponding disparity vectors used to create the reconstructed images. The quality metrics use the outputs of the disparity estimation process to determine the temporal or view feature consistency of the input sequences. Three different embodiments of consistency metrics will be discussed in the following paragraphs. Throughout the present disclosure, they will be called as follows:

1) Disparity vector consistency metric
2) Disparity estimated feature difference metric
3) Disparity estimated feature variation metric The disparity vector consistency metric is a full reference metric making use of both the reference and test sequences, while the other metrics are non-reference metrics. The results from the metrics can be combined into a final metric, and/or be combined with one or more other metrics of different type, similarly to what shown by reference numerals 122 and 126 in FIG. 1. For example, assuming that the metric is a temporal metric, this can be combined with several other spatial quality metrics to determine the final objective quality of the sequence. Similarly, assuming that the metric is a multi-view metric, the metric could be combined with a temporal metric, possibly generated using the same principles, and other spatial metrics, resulting in a joint spatio-temporal-stereo view quality metric. More generally, a metric in a first domain can be combined with one or more additional metrics in other domains.

Disparity Vector Consistency Metric

As mentioned above, the disparity vector consistency metric is a full reference metric. It relies on the assumption that if the disparity estimation is performed accurately on both the reference sequence and the test sequence (see, for example, sequences 102 and 104 of FIG. 1), the disparity vectors (see, for example, vectors 206 of FIG. 2) calculated for each pixel, block, or region in the reference and test sequences should be similar unless the test sequence contains temporal or view distortions.

The expectation of disparity vector similarity, however, can also depend on a number of other factors such as the temporal distance (or viewing angle or spatial distance in the case of multi-view images) between the image and its neighbor for which disparity vectors are extracted, the occurrence of scene changes/transitions and other discontinuities in the underlying video content including illumination changes, occlusions caused by object and image edges, etc.

According to an embodiment of the present disclosure, these factors are taken into account in the disparity vector consistency calculation. Therefore, in accordance with such embodiment, the disparity vector consistency metric for each image at time, or view, n, of the test sequence given the corresponding image at time or view, n, of the reference sequence can be obtained as, $$D_{DV}(f_n^t | f_n^r) = \sum_{\substack{i=-N \\ i \neq 0}}^{N} w_{n+i} \cdot \left( \sum_s c_{n+i}(s) \cdot h(dv_{n+i}^t(s), dv_{n+i}^r(s)) \right) \quad (1)$$

In Equation (1), the consistency function $h(dv_{n+i}^t(s), dv_{n+1}^r(s))$ between a test image disparity vector and a reference image disparity vector returns a value in the range [0, 1] such that a higher value represents lower feature consistency. In its simplest form, the consistency function can be an indicator function that returns 0, if the two disparity vectors are deemed similar, and 1, if the two disparity vectors are different. The test of whether two disparity vectors are similar can be performed using a phase and magnitude difference threshold between the two disparity vectors such that if either is exceeded, then the disparity vectors are deemed different. Another possibility is to let the consistency function $h(\cdot)$ depend on the magnitude of the difference vector. For example, $h(\cdot)$ could be $$\frac{\|dv_{n+i}^t(s) - dv_{n+i}^r(s)\|}{MAX\_DV},$$

where MAX_DV is the maximum possible disparity vector magnitude.

Equation (1) also depends on parameters $w_{n+i}$ and $c_{n+i}(s)$. The parameter $w_{n+i}$ is a "global" weighting parameter, meaning that there is one such parameter per image at a temporal location or view. The value of $w_{n+i}$ represents the probability that the image at the temporal location or view n+i will contain similar disparity vectors in both the reference and test sequences. Equation (1) assumes that $$\sum_{\substack{i=-N, i \neq 0}}^{N} w_{n+i} = 1.$$

Generally, the global parameter $w_{n+i}$ depends on the temporal distance, i, as well as on whether the underlying content is detected to contain an event, such as a scene change, which will affect the accuracy of the disparity estimation. For multi-view disparity analysis, the global parameter $w_{n+i}$ could also depend on the viewing angle or distance between the views, if that is known. Typically, in the temporal metrics, $w_{n+i}$ is set to decrease as i increases in absolute value. If a scene change is detected between the current image and the neighboring image, then the global parameter $w_{n+i}$ is set to 0, and the weights given to the remaining images are adjusted accordingly.

The parameter $c_{n+i}(s)$ is a "local" weighting parameter dependent on the spatial neighborhood of the reference image, meaning that there is one such parameter for each pixel s of an image or, more generally, for a region or set of regions of an image. The value of the local parameter $c_{n+i}(s)$ lies in the range [0, 1] and it represents the probability that the disparity vectors in the reference and test sequences will be consistent given the consistency of neighboring disparity vectors in the reference sequence.

One possibility for calculating the value of the local parameter $c_{n+i}(s)$ is to define a function dependent on the number of disparity vectors in the neighborhood of s in the test sequence that are similar to the disparity vector at s in the reference sequence. The similarity of disparity vectors can be computed in the same manner as in the computation of the consistency function $h(\cdot)$ (e.g., using thresholds for differences in disparity vector phase and magnitude). The neighborhood of s, for example, can be limited to the 4-connected neighborhood of the associated pixel block. Larger neighborhoods may also be considered with appropriate weightings to take into account the distance from s. Disparity vectors estimated near object and image boundaries, generally tend to be less correlated with their spatial neighbors, and also less correlated between the test and reference sequences. Therefore, using such disparity vectors can adversely affect the accuracy of the distortion metric. The local weighting parameter attempts to resolve this issue by lowering the weights assigned to potentially spurious disparity vector differences.

In the multi-view case, the above metric $D_{DV}$ can be calculated in the temporal domain, the multi-view domain, or in a combined temporal and multi-view domain.

Figure 4:
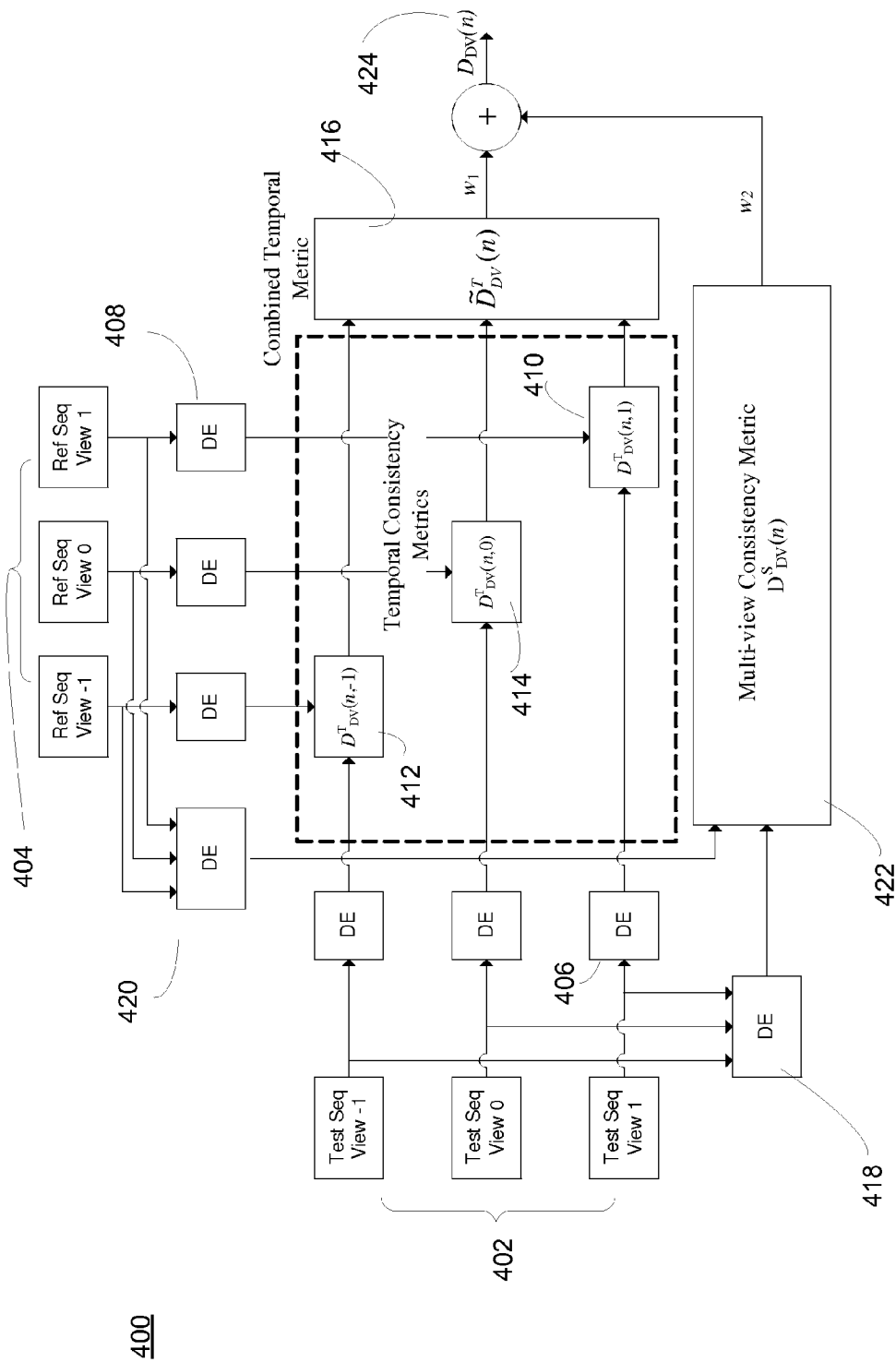
FIG. 4 shows a first embodiment of metric in accordance with the present disclosure.

FIG. 4 shows an embodiment of a method or system 400 where the metric $D_{DV}$ is calculated in a combined temporal and multi-view domain. In the temporal domain, the metric can be calculated separately for each view to obtain a set of metrics, $D_{DV}^T(n,m)$ where n represents time, and m represents the view for which the temporal metric is calculated. See, in particular, blocks 402 and 406, which represent the test sequence and reference sequence inputs, respectively, for each view. Disparity estimation is calculated for each test sequence 406 and for each reference sequence 408. For each view at time n, the outputs of the disparity estimation blocks for the test sequence and reference sequence (see, e.g., the disparity vectors 206 of previously discussed FIG. 2) are used to calculate the $D_{DV}$ function of Equation (1) in the temporal domain as shown, for example, by blocks 410, 412 and 414 of FIG. 4. In particular, block 410 shows the calculation of $D_{DV}$ at each time n for view i=1, block 412 shows the calculation of $D_{DV}$ at each time n for view i=-1, and block 414 shows the calculation of $D_{DV}$ at each time n for view i=0.

In the multi-view domain, the metric $D_{DV}$ can be calculated at each time n, to obtain a metric, $D_{DV}^S(n)$, that measures the disparity vector consistency between the views. In order to do that, disparity estimation is performed among the various views of the test sequence (see block 418 of FIG. 4) and among the various views of the reference sequence (see block 420 of FIG. 4). The outputs of the disparity estimation blocks 418 and 420 for the test sequence and the reference sequence in the multi-view domain (see, e.g., the disparity vectors 206 of previously discussed FIG. 2 when applied to the multi-view domain) are then used to calculate the $D_{DV}$ function of Equation (1) in the multi-view domain, $D_{DV}^S(n)$, as shown by block 422 in FIG. 4.

In order to combine the temporal domain results 410, 412, 414 and the multi-view domain results 422, first the temporal metrics over all the views can be combined at block 416 to obtain a value $\tilde{D}_{DV}^T(n)$ using, for example, the average of the values at each m. In other embodiments, instead of the average, the variance, minimum value or maximum value may also be used depending on the application and how the human visual system reacts to differences in temporal quality across views. Then a combination of the multi-view and combined temporal metric can be used as a temporal-multi-view disparity vector consistency metric, e.g., $$D_{DV}^{ST}(n) = F_{DV}^{ST}(\tilde{D}_{DV}^T(n), D_{DV}^S(n)), \quad (2)$$

The function $F_{DV}^{ST}(\bullet)$ can, for example, be a weighted combination, as indicated by reference numeral 424 in FIG. 4, where the weights $w_1$, and $w_2$ can be determined empirically based on subjective data.

The above metric can also be defined for a specific region, or set of regions (also possibly including regions subsampled at different resolutions and/or regions selected as a result of an image partitioning process, such as image segmentation analysis), within an image, instead of the entire image. The metric may also be pooled over time (multiple images in the sequence) to determine statistics such as the average, minimum, maximum consistency within a sequence of images or pooled over a set of regions within the image. The specific region or set of regions can be user-selectable or can be detected and/or selected using an automatic region of interest detection scheme, such as, for example, a k-means segmentation method, watersheds, algorithms based on the Hausdorff distance, or algorithms targeting applications such as face detection (e.g., Gabor Feature Extraction, Viola-Jones face detector, etc). Moreover, while the embodiment shown in FIG. 4 makes reference to a combined temporal/multi-view embodiment, the person skilled in the art will understand that, more generally, disparity estimations in a first domain and a second domain (or even more than two domains) can be used to calculate the metrics expressed, for example, by the formula of Equation (1) and then combined, for example, through the formula of Equation (2).

Disparity Estimated Feature Difference Metric

As described above, a second embodiment of a metric in accordance with the present disclosure, comprises the disparity estimated feature difference metric, which is a non reference metric. Reference can be made to the representation 500 of FIG. 5, where calculation of an example of such metric is discussed in detail.

Alternatively (or additionally) in relation to the previous embodiment, this metric will also use the results of the disparity compensation blocks 204 of previously discussed FIG. 2. In particular, the metric attempts to measure the temporal or multi-view consistency between images of a given sequence by comparing the image $f_n$ to predictions $\hat{f}_{n-N}, \ldots, \hat{f}_{n-1}, \hat{f}_{n+1}, \ldots, \hat{f}_{n+N}$ of the image obtained by disparity estimation from previous and future images in the sequence for temporal distortion, or multiple images of a scene for multi-view distortion. Such disparity estimation has already been discussed above with reference to FIG. 2 and FIG. 3. Again, the factors mentioned in the disparity vector consistency metric can affect the calculation of the feature difference metric. Therefore, the disparity estimated feature difference metric for each image, n, of the test sequence can be obtained as, $$D_{FD}(f_n^t) = \sum_{\substack{i=-N \\ i \neq 0}}^{N} w_{n+i} \cdot \left\{ \sum_{x=1}^{H} \sum_{y=1}^{V} \left[ c_{n+i}(x, y) \cdot d(\hat{f}_{n+i}^t(x, y), f_n^t(x, y)) \right] \right\}, \quad (3)$$

where, H and V are respectively the number of horizontal and vertical pixels in the image region of interest for which the metric is calculated.

Figure 5:
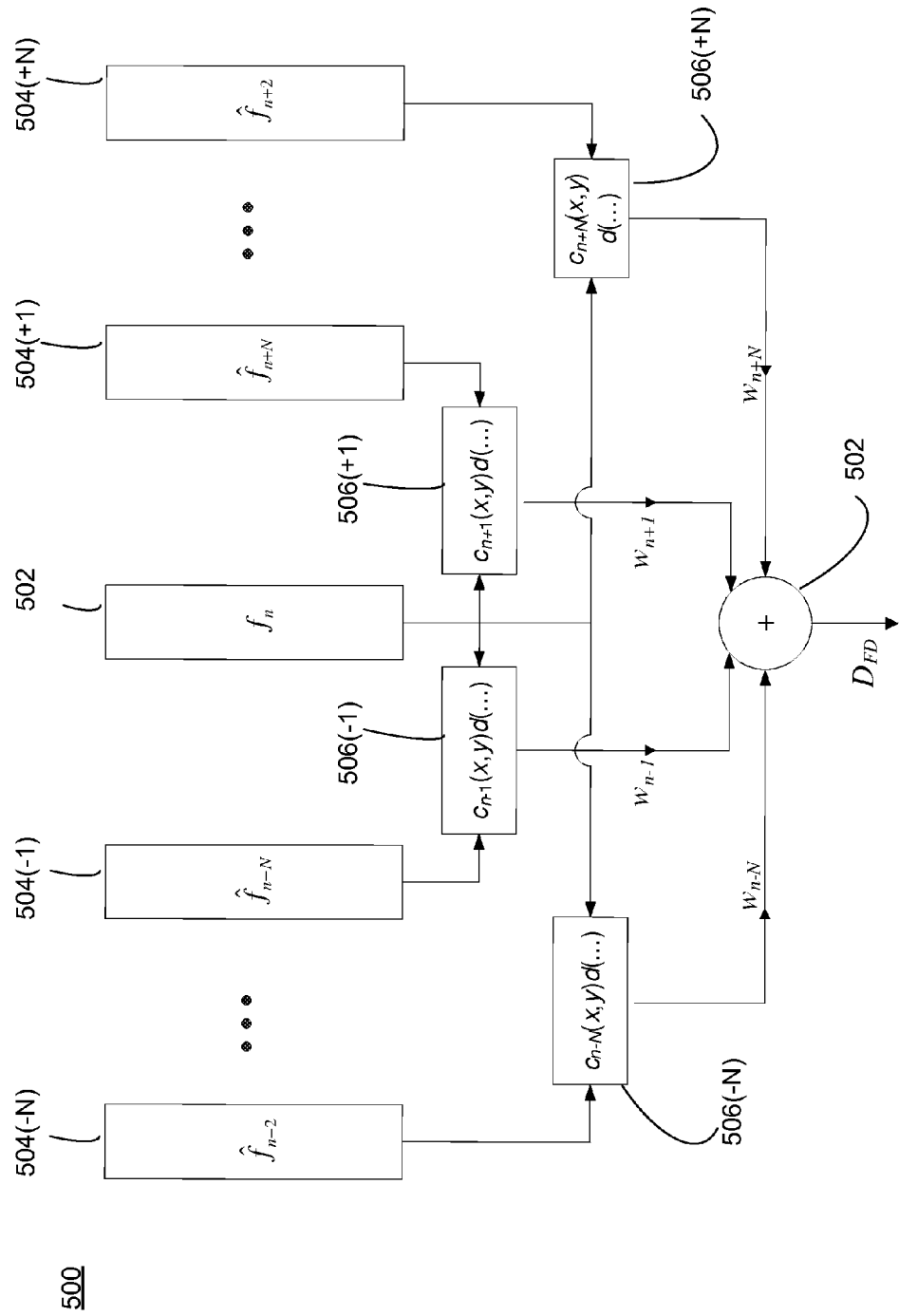
FIG. 5 shows a second embodiment of metric in accordance with the present disclosure.

FIG. 5 shows an example of how the $D_{FD}$ function of Equation (3) can be obtained. Reference numeral 502 represents the input image $f_n$. Reference numerals 504(-N), ..., 504 (-1), 504(+1), ..., 504(+N), etc., represent the various reconstructed images $\hat{f}_{n-N}, \ldots, \hat{f}_{n-1}, \hat{f}_{n+1}, \ldots, \hat{f}_{n+N}$ obtained at the end of the estimation process previously discussed FIG. 2. Blocks 506(-N), 506(4), 506(+1), 506(+N), etc., represent the calculation of the expression inside the square brackets of Equation (3), where local weighting parameters $c_{n+i}(s)$ are taken into consideration. Once this is done, the output 508 is generated through a sum where also the global weighting parameters $w_{n+i}$ are taken into account.

The region of interest may be the entire image, or a sub-image. A sub-image could be of arbitrary shape and/or size, or could be of a predefined shape or size, e.g. blocks of size 32×32. Sub-images could also be non-overlapping or overlapping and could span multiple images. A further extension of the metric can be to compute the $D_{FD}$ metric over multiple image regions and spatially pool the values. The spatial pooling can include using the maximum distortion among all the regions or an average of the values above an x% percentile (e.g., average of distortion values above 90% percentile), which takes into account the tendency for subjective quality to be heavily biased by regions with high distortion or an average distortion over all the regions of interest. As in the previous metric, the values can also be pooled temporally to obtain a combined metric over time. Distortion could also be weighted according to foreground/background, object analysis, texture etc.

As already mentioned above and similarly to the previous embodiment, $w_{n+i}$ represents a global weighting parameter and $c_{n+i}$ represents a local weighting parameter. The function $d(\hat{f}_{n+i}^t(x, y), f_n^t(x, y))$ represents a pixel difference measure between the pixel (x,y) in image n, and the corresponding predicted pixel from image n+i. For example, this can be the absolute difference of pixel values, in which case $D_{FD}$ will represent a weighted sum absolute difference (SAD), or the square of the difference of pixel values, in which case $D_{FD}$ will represent a weighted sum squared error (SSE). Other distance metrics could also be used.

As spurious differences in pixel values can occur along image and object boundaries, again, disparity vector consistency between neighboring pixel blocks can be used to guide the local weighting parameter, $c_{n+i}(x,y)$. As before, the global weighting parameter should take into account the temporal or multi-view distance between frames, as well as the possibility of global events such as scene changes in the sequence.

Figure 6:
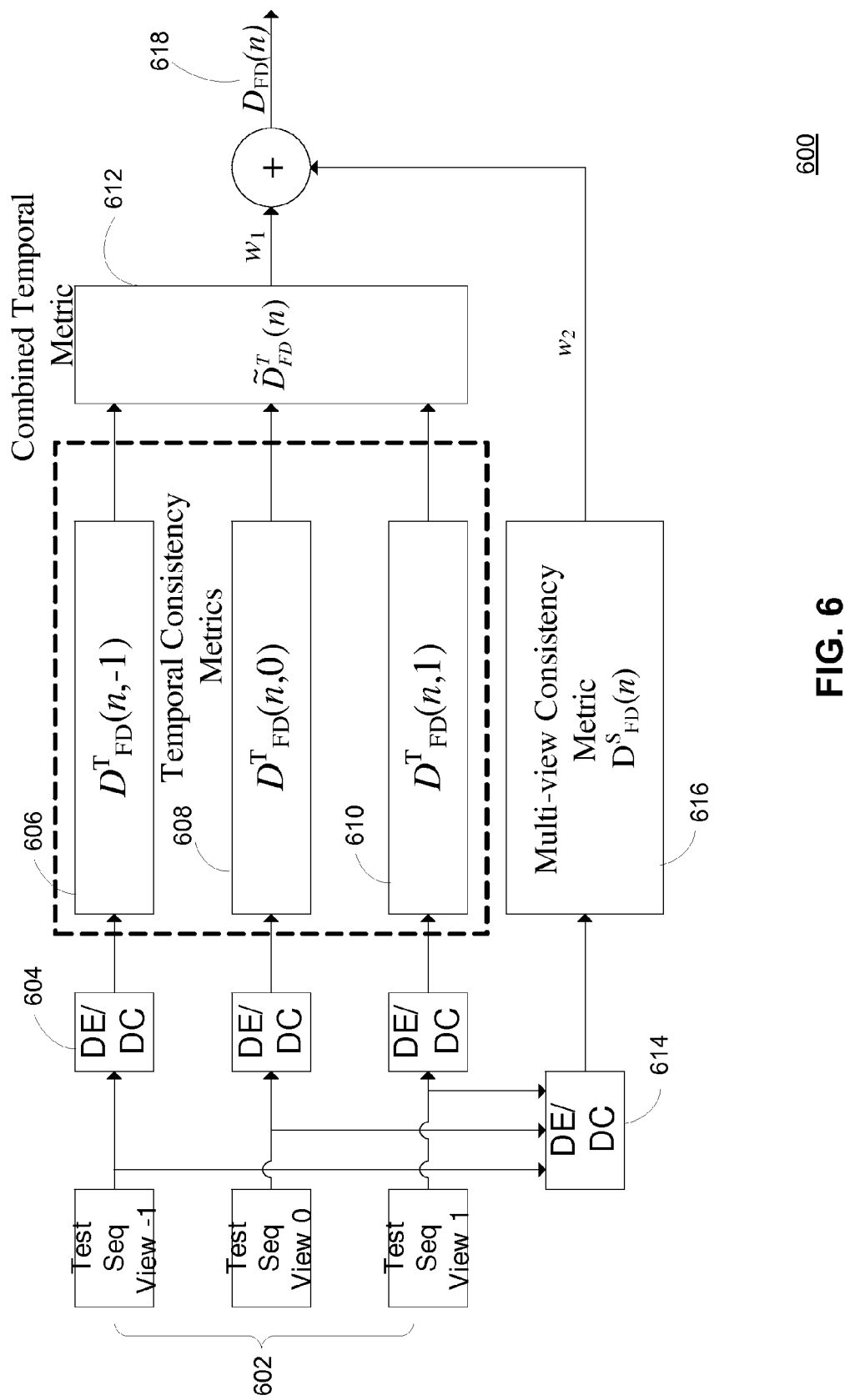
FIG. 6 shows a combined temporal/multi-view example of the embodiment of FIG. 5.

In the stereo and multi-view cases, both temporal and spatial view consistency may be important in determining the perceived quality of the output video. Therefore, the above metric can be extended to include both the temporal and the multi-view domain, as shown in the embodiment of method or system 600 of FIG. 6, which is conceptually similar to the embodiment of FIG. 4. Differently from such embodiment, disparity correction (DC) will also be performed, as indicated by the wording DE/DC on blocks 604 and 614.

In the multi-view case, $D_{FD}$ can be calculated temporally for each view (see blocks 606, 608 and 610), and then combined (see block 612) as an average, variance, maximum, or minimum of the values over all views. This will give a combined temporal distortion metric at a particular frame at time n, $\tilde{D}_{FD}^{T}(n)$. Then, this metric can be further combined with the multi-view consistency metric 616 that can be obtained by applying Equation (3) in the spatial multi-view domain, $D_{FD}^{S}(n)$. Therefore, the final multi-view temporal consistency metric 618 at time n can be obtained as in Equation (2) to be, $$D_{FD}^{ST}(n)=F_{FD}^{T}(\tilde{D}_{FD}^{T}(n), D_{FD}^{S}(n)). \quad (4)$$

Disparity Estimated Feature Variation Metric

While the disparity estimated feature difference metric discussed above with reference to FIG. 5 and FIG. 6 calculates an average difference measure between pixel values in an image and its neighbors, it does not measure the variation in pixel values over time. Therefore, the present disclosure also proposes a disparity estimated feature variation metric to take into account temporal and multi-view variations through inclusion of disparity compensated pixels. This metric is also a non reference metric. It is calculated as, $$D_{FV}(f_n^t) = \sum_{x=1}^{H}\sum_{y=1}^{V} \frac{\sum_{i=-N}^{N}[w_{n+i} \cdot c_{n+i}(x,y) \cdot V(\hat{f}_{n+i}^t(x,y), \overline{f}_n^t(x,y))]}{\sum_{i=-N}^{N} w_{n+i} \cdot c(x,y)}, \quad (5)$$

Where $V(\bullet)$ represents a distance metric such as, for example, a function of the form, $(\hat{f}_{n+i}^t - \overline{f}_n^t)^n$ or $(|\hat{f}_{n+i}^t| - |\overline{f}_n^t|)$, and $\overline{f}_n^t(x,y)$, is a weighted mean calculated as, $$\overline{f}_n^t(x,y) = \frac{\sum_{i=-N}^{N}[w_{n+i} \cdot c_{n+i}(x,y) \cdot \hat{f}_{n+i}^t(x,y)]}{\sum_{i=-N}^{N} w_{n+i} \cdot c_{n+i}(x,y)}. \quad (6)$$

Note that when i=0, $\hat{f}_{n+i}^t f_{n+i}^t$ since that represents the actual $n^{th}$ image region and not a prediction. Again, $w_{n+i}$ is a global weight, and $c_{n+i}(x,y)$ is a local spatial weight determined by the neighborhood of the pixel. As in the previous metric, H and V represent the number of horizontal and vertical pixels in the image region of interest. Also, again, the metric can be calculated in multiple image regions and then combined to form a final image based metric using for example, the average, maximum, or average of the values above a threshold. While in this case, the variation is computed at a pixel level, another possibility is to compute the metric at multiple resolutions by successively downsampling the image prior to computing the metric. In its simplest form the multi-resolution technique can be implemented by averaging the pixel values over a block of pixels with varying block sizes and computing the variation at a block level. Overlapped blocks can also be used to smooth out spurious values at the block boundaries. Complexity in the calculation of Equations (5) and (6) can be reduced by subsampling the neighborhood of the pixel. In case of a combined spatial, temporal and multi-view metric, neighborhood is defined in the spatial, temporal and multi-view dimensions.

Figure 7:
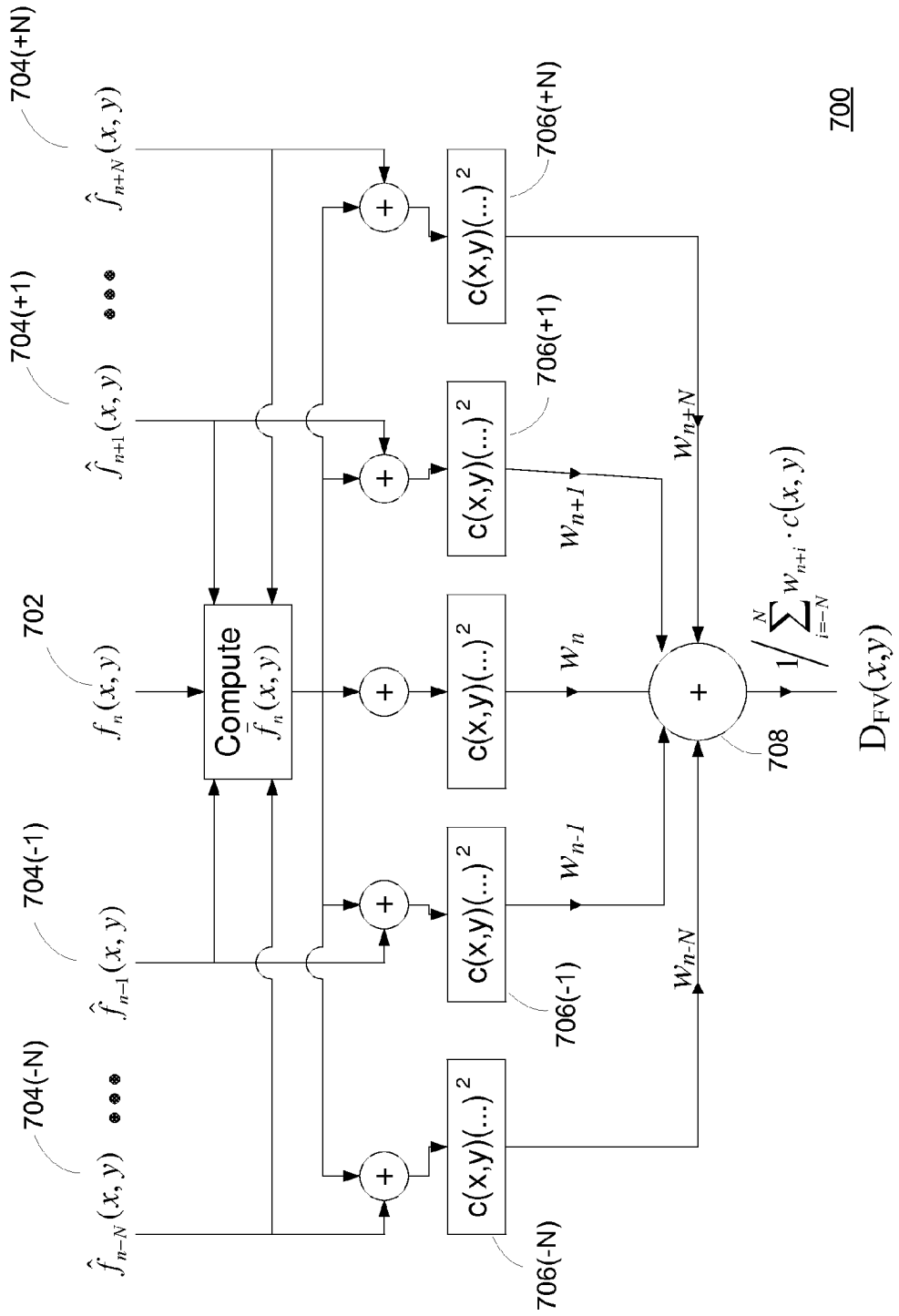
FIG. 7 shows a third embodiment of metric in accordance with the present disclosure.

FIG. 7 shows an example of how the $D_{FV}$ function of Equation (5) can be obtained. Reference numeral 702 represents a pixel value of the input image $f_n(x, y)$. Reference numerals 704(−N), 704(4), 704(+1), 704(+N), etc., represent pixel values of the various reconstructed images $\hat{f}_{n-N}(x, y), \ldots, \hat{f}_{n-1}(x, y), \hat{f}_{n+1}(x, y), \ldots, \hat{f}_{n+N}(x, y)$ obtained at the end of the estimation process previously discussed FIG. 2. Blocks 706(−N), 706(−1(, 706(+1), 706(+N), etc., represent the calculation of the expression inside the square brackets of Equation (5), where local weighting parameters $c_{n+i}(s)$ are taken into consideration. Once this is done, the output 708 is generated through a sum where also the global weighting parameters $w_{n+i}$ are taken into account.

As in Equation (4), the feature variation metric can also be extended to the combined temporal and multi-view domains using, $$D_{FV}^{ST}(n)=F_{FV}^{ST}(\tilde{D}_{FV}^{T}(n), D_{FV}^{S}(n)), \quad (7)$$

where $\tilde{D}_{FV}^{T}(n)$ and $D_{FD}^{S}(n)$ represent a combined temporal variation metric at time n, and a multi-view feature variation metric at time n, respectively. Note that in the stereo case, when only two views are present, the first term alone can be used as a stereo-temporal feature variation metric. In one embodiment, $\tilde{D}_{FV}^{T}(n)$ can be the average of the temporal variation measurements obtained for each view. In another embodiment, the combined temporal variation metric can be used to measure the differences among the temporal variation metrics calculated for each view. In that case, $$\tilde{D}_{FV}^{T}(n) = \frac{\sum_{m} w_m^S V(D_{FV}^{T}(n,m), \overline{D}_{FV}^{T}(n))}{\sum_{m} w_m^S}, \quad (8)$$

Where $V(\bullet)$ represents a distance metric as in (5), $$\overline{D}_{FV}^{T}(n) = \frac{\sum_{m} w_m^S D_{FV}^{T}(n,m)}{\sum_{m} w_m^S}, \quad (9)$$

and $w_m^s$ represents a weighting parameter applied to each view m.

Combined Feature Distortion Metric

The individual temporal and multi-view, distortion metrics of the three embodiments discussed above can be combined to form various combined distortion metrics such that the effects of the individual distortions are weighted according to their perceptual significance, as also indicated by the combination symbol 122 discussed with reference to FIG. 1. For example, a combined temporal distortion metric which takes into account all of the above features can be computed as a weighted combination of each individual metric. A combined multi-view video distortion metric can be computed in a similar way. At each time n, the combined disparity estimated distortion can be calculated as, $$D_{DE}(n) = F_{DE}(D_{DV}(n), D_{FD}(n), D_{FV}(n)), \quad (10)$$

where $F_{DE}$ can, for example, be a linear combination function such as, $$D_{DE}(n) = \kappa_{DV} D_{DV}(n) + \kappa_{FD} D_{FD}(n) + \kappa_{FV} D_{FV}(n), \quad (11)$$

where, $\kappa_{DV}$, $\kappa_{FD}$, and $\kappa_{FV}$ are the perceptual weights applied to each metric. The weights can be obtained empirically using an appropriately designed subjective test. The values of $D_{FD}(n)$ and $D_{FV}(n)$ may already be combined temporal and multi-view metrics as well. Therefore, the value of $D_{DE}$ can represent any one of a distortion estimated multi-view consistency metric, temporal consistency metric, or a temporal and multi-view consistency metric. Also, the metric values may be obtained on subsampled or reduced resolution images, or on specific regions of interest as mentioned in the previous sections. Temporal or view subsampling could also be considered.

Combined Spatio-Temporal Multi-View Distortion Metrics

The combined temporal/multi-view distortion metrics can be further used as input to a spatio-temporal quality metric by using a weighted combination of the spatial and temporal features. Therefore, a final spatio-temporal-multi-view distortion can be calculated as, $$D_{SDE}(n) = F_{SDE}(D_S(n), D_{DE}(n)), \quad (12)$$

where, as in (10), $F_{SDE}$ can be a linear combination, $$D_{SDE}(n) = \kappa_S D_S(n) + \kappa_{DE} D_{DE}(n), \quad (13)$$

where, $\kappa_S$, and $\kappa_{DE}$ represent weights assigned to the spatial and disparity estimated metrics, respectively. In (13), the spatial distortion metric $D_S$ can be any one or combination of the existing spatial quality metrics such as PSNR, MSE, SSIM (see reference [9]) etc., or a combination of spatial feature metrics.

As described before, the above metrics can also be calculated over multiple image regions, instead of the entire image at once, or on subsampled images at various resolutions, etc. The combined metrics can then be pooled over the multiple image regions or resolutions, and then temporally over the entire sequence to obtain a combined quality metric for the sequence. The pooling can simply be that of averaging over the distortion values for each region. Another possibility is to compute the maximum distortion over all regions, and use a combination of the maximum and mean distortion. For temporal pooling, another possibility is to compute a maximum average distortion over a moving window.

Moreover, embodiments of the methods and systems according to the present disclosure can also be applied to still images, for example multi-view/stereo still representation.

The examples set forth above are provided to give those of ordinary skill in the art a complete disclosure and description of how to make and use the embodiments of the methods and systems for quality evaluation of the disclosure, and are not intended to limit the scope of what the inventors regard as their disclosure. Modifications of the above-described modes for carrying out the disclosure may be used by persons of skill in the video art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

The entire disclosure of each document cited (including patents, patent applications, journal articles, abstracts, laboratory manuals, books, or other disclosures) in the Background, Summary, Detailed Description and List of References is hereby incorporated herein by reference.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

An embodiment of the present invention may thus relate to one or more of the example embodiments enumerated below.

1. A method for evaluating the quality of a sequence of images, comprising:
    performing disparity estimation among images in one or more domains to generate disparity vectors; and
    computing a metric based on the disparity vectors to evaluate the quality of the sequence of images.
2. The quality evaluation method of Enumerated Example Embodiment 1, wherein:
    the disparity estimation comprises a test sequence disparity estimation performed among images pertaining to a test image sequence and a reference sequence disparity estimation performed among images pertaining to a reference image sequence, and
    the metric is based on the test sequence disparity estimation and the reference sequence disparity estimation.
3. The quality evaluation method of Enumerated Example Embodiment 1, wherein:
    the disparity estimation comprises a test sequence disparity estimation performed among images pertaining to a test image sequence, and
    the metric is based, at least in part, on the test sequence disparity estimation.
4. The quality evaluation method of Enumerated Example Embodiment 2, further comprising:
    performing spatial filtering of the test image sequence and the reference image sequence before performing disparity estimation of the test image sequence and the reference image sequence.
5. The quality evaluation method of Enumerated Example Embodiment 2, further comprising:
    performing registration between the test image sequence and the reference image sequence before performing disparity estimation of the test image sequence and the reference image sequence.
6. The quality evaluation method of Enumerated Example Embodiment 5, wherein registration is performed by registering the test image sequence with the reference image sequence.
7. The quality evaluation method of Enumerated Example Embodiment 5, wherein registration is performed by registering the reference image sequence with the test image sequence.
8. The quality evaluation method of Enumerated Example Embodiment 5, wherein registration is performed with registering the test image sequence with the reference image sequence, registering the reference image sequence with the test image sequence, and combining the registering results.

9. The quality evaluation method of Enumerated Example Embodiment 3, further comprising:
   performing spatial filtering of the test image sequence before performing disparity estimation of the test image sequence.

10. The quality evaluation method of Enumerated Example Embodiment 1, wherein:
    the disparity estimation comprises a test sequence disparity estimation performed among images pertaining to a test image sequence and a reference sequence disparity estimation performed among images pertaining to a reference image sequence, and
    the metric based on the disparity estimation comprises a combination between a first metric based both on the test sequence disparity estimation and the reference sequence disparity estimation and a second metric based on the test sequence disparity estimation.

11. The quality evaluation method according to any one of the previous Enumerated Example Embodiments, wherein the metric based on the disparity estimation is combined with one or more further metrics.

12. The quality evaluation method according to any one of the previous Enumerated Example Embodiments, wherein the one or more domains comprise one or more of: temporal domain, spatial domain, multi-view domain, or brightness domain.

13. The quality evaluation method according to any one of the previous Enumerated Example Embodiments, further comprising performing disparity compensation among the images in the one or more domains, wherein the disparity compensation is based, at least in part, on the disparity estimation and provides image predictions, and wherein the metric is based, at least in part, on at least one of the disparity estimation and the disparity compensation.

14. The quality evaluation method according to any one of the previous Enumerated Example Embodiments, wherein the disparity estimation among the images comprises considering, for each image, image neighbors of said each image in the one or more domains.

15. The quality evaluation method of Enumerated Example Embodiment 14, wherein consideration of the image neighbors is performed through subsampling.

16. The quality evaluation method of Enumerated Example Embodiment 14, wherein the one or more domains comprise one or more of a temporal domain, spatial domain, multi-view domain and frequency domain, and wherein the image neighbors are image temporal, spatial, multi-view and/or frequency neighbors.

17. The quality evaluation method of Enumerated Example Embodiment 16, wherein the image neighbors comprise one or more of: precedent image neighbors, subsequent image neighbors, or both precedent and subsequent image neighbors.

18. The quality evaluation method of Enumerated Example Embodiment 13, wherein computing of the metric is based on at least one of: image disparity information obtained through disparity estimation or reconstructed image information obtained through disparity compensation.

19. The quality evaluation method of Enumerated Example Embodiment 18, wherein the image disparity information is in form of an image disparity vector and the reconstructed image information is in form of a reconstructed image function.

20. The quality evaluation method of Enumerated Example Embodiment 13, wherein the disparity compensation among the images comprises considering, for each image, image neighbors of said each image in the one or more domains.

21. The quality evaluation method of Enumerated Example Embodiment 20, wherein consideration of image neighbors is performed through subsampling.

22. The quality evaluation method of Enumerated Example Embodiment 21, wherein the disparity compensation among the images comprises further considering, for each image, results of a previous disparity compensation.

23. The quality evaluation method of Enumerated Example Embodiment 22, wherein the results of the previous disparity compensation are combined among neighbor images.

24. The quality evaluation method of Enumerated Example Embodiment 23, wherein the one or more domains include a temporal domain and a multi-view domain, whereby the neighbor images comprise temporal neighbors and multi-view neighbors of said each image.

25. The quality evaluation method according to any one of the previous Enumerated Example Embodiments, wherein the metric is computed on the basis of i) the disparity estimation, ii) a set of local parameters, configurable region by region or pixel by pixel for each image, and iii) a set of global parameters, configurable image by image.

26. The quality evaluation method of Enumerated Example Embodiment 25, wherein the metric is a reference metric based on a test image sequence and a reference image sequence, and wherein metric computation on the basis of the disparity estimation takes into account a comparison between test image disparity information and reference image disparity information.

27. The quality evaluation method of Enumerated Example Embodiment 26, wherein the test image disparity information is provided by way of a test image disparity vector and the reference image disparity information is provided by way of a reference image disparity vector, whereby the comparison is a vector comparison between the test image disparity vector and the reference image disparity vector.

28. The quality evaluation method of Enumerated Example Embodiment 26 or 27, wherein values of the global parameters for each image represent a probability that the test image disparity vector for said each image is similar to the reference image disparity vector for said each image.

29. The quality evaluation method of Enumerated Example Embodiment 28, wherein the disparity estimation among the images comprises considering, for each image, image neighbors of said each image in the one or more domains, and wherein the values of the global parameters for a neighbor image depend on a distance between the neighbor image and said each image.

30. The quality evaluation method according to any one of Enumerated Example Embodiments 26 to 29, wherein values of the local parameters for each image pixel represent a probability that the test image disparity vector for said each image pixel is similar to the reference image disparity vector for said each image pixel.

31. The quality evaluation method of Enumerated Example Embodiment 30, wherein the values of the local parameters for each image pixel are calculated through a function dependent on a number of disparity vectors in a neighborhood of said each image pixel in the reference sequence that are similar to the disparity vector at said each image pixel in the reference sequence.

32. The quality evaluation method according to any one of Enumerated Example Embodiments 25 to 31, wherein the metric is computed in a combined multi-domain environment, comprising two or more domains.
33. The quality evaluation method of Enumerated Example Embodiment 32, wherein the metric is computed separately for each domain and then combined.
34. The quality evaluation method of Enumerated Example Embodiment 32 or 33, wherein the metric is combined by way of a weighted combination.
35. The quality evaluation method of Enumerated Example Embodiment 33 or 34, wherein after the metric is computed separately for each domain and before being combined, an intermediate combination inside one or more of said domains is provided.
36. The quality evaluation method according to any one of Enumerated Example Embodiments 32 to 35, wherein the two or more domains include a temporal domain, a multi-view domain, a frequency domain and a brightness domain.
37. The quality evaluation method according to any one of the previous Enumerated Example Embodiments, wherein the metric is computed on the entire image or on a subset of the entire image.
38. The quality evaluation method of Enumerated Example Embodiment 37, wherein the subset of the entire image comprises one or more regions within the image.
39. The quality evaluation metric of Enumerated Example Embodiment 38, wherein the metric is a metric pooled over the one or more regions within the image.
40. The quality evaluation metric of Enumerated Example Embodiment 38, wherein the one or more regions within the image are user-selectable regions.
41. The quality evaluation method of Enumerated Example Embodiment 38, wherein the one or more regions within the image are selected as a result of image segmentation analysis.
42. The quality evaluation method of Enumerated Example Embodiment 38, wherein the one or more regions within the image are selected using an automatic region of interest detection scheme.
43. The quality evaluation method of Enumerated Example Embodiment 42, wherein the automatic region of interest detection scheme comprises one or more of object segmentation methods or algorithms targeting applications.
44. The quality evaluation method of Enumerated Example Embodiment 43, wherein the object segmentation methods comprise one or more of: a k-means segmentation method, a watershed algorithm, algorithms based on Hausdorff distance.
45. The quality evaluation method of Enumerated Example Embodiment 43 or 44, wherein the algorithms targeting applications comprise a face detection algorithm.
46. The quality evaluation metric of Enumerated Example Embodiment 38, wherein the one or more regions are regions of the image subsampled at different resolutions using filters and/or sampling methods.
47. The quality evaluation method according to any one of the previous Enumerated Example Embodiments, wherein the metric is a metric pooled over a plurality of images in the one or more domains.
48. The quality evaluation method of Enumerated Example Embodiment 47, wherein the metric is for statistic analysis within the plurality of images.
49. The quality evaluation method of Enumerated Example Embodiment 13, wherein the metric is computed on the basis of i) the image predictions, ii) a set of local parameters, configurable region by region or pixel by pixel for each image, and iii) a set of global parameters, configurable image by image.
50. The quality evaluation method of Enumerated Example Embodiment 49, wherein the metric is a no-reference metric based on a test image sequence and metric computation on the basis of the image predictions takes into account a comparison between pixels in a selected image of the test sequence and corresponding pixels of a neighbor image of the selected image.
51. The quality evaluation method of Enumerated Example Embodiment 49 or 50, wherein the metric is computed in a combined multi-domain environment, comprising two or more domains.
52. The quality evaluation method of Enumerated Example Embodiment 51, wherein the two or more domains comprise a temporal domain and a multi-view domain.
53. The quality evaluation method of Enumerated Example Embodiment 51 or 52, wherein the metric is computed separately for each domain and then combined.
54. The quality evaluation method of Enumerated Example Embodiment 53, wherein the metric is combined by way of a weighted combination.
55. The quality evaluation method according to any one of Enumerated Example Embodiments 49 to 54, wherein the metric is further computed on the basis of iv) variation in corresponding pixel values over time.
56. The quality evaluation method of Enumerated Example Embodiment 55, wherein iv) includes disparity compensated pixels.
57. The quality evaluation method of Enumerated Example Embodiment 56, wherein computation on the basis of iv) further comprises deblocking.
58. The quality evaluation method of Enumerated Example Embodiment 57, wherein the metric is a no-reference metric based on a test image sequence and metric computation on the basis of the image predictions takes into account a comparison between pixels in a selected image of the test sequence and corresponding pixels of a neighbor image of the selected image.
59. The quality evaluation method of Enumerated Example Embodiment 57 or 58, wherein the metric is computed in a combined multi-domain environment, comprising two or more domains.
60. The quality evaluation method of Enumerated Example Embodiment 59, wherein the two or more domains comprise a temporal domain and a multi-view domain.
61. The quality evaluation method of Enumerated Example Embodiment 59 or 60, wherein the metric is computed separately for each domain and then combined.
62. The quality evaluation method of Enumerated Example Embodiment 61, wherein the metric is combined by way of a weighted combination.
63. The quality evaluation method according to any one of the previous Enumerated Example Embodiments, the method being associated with one or more processes, comprising: a video compression process, a video pre-processing process, a video post-processing process, or a video watermarking process.
64. The quality evaluation method according to any one of the previous Enumerated Example Embodiments, wherein the images are in a bitstream mode.
65. The quality evaluation method according to any one of the previous Enumerated Example Embodiments, wherein the images comprise still images.
66. A system for computing consistency of a test image sequence, comprising:

a disparity estimator, to estimate disparities among images of the test image sequence or disparities between images of the test image sequence and images of a reference image sequence through generation of disparity vectors; and
a metric calculator, to compute the consistency of the test image sequence as a function of the disparity vectors generated by the disparity estimator.
67. The system of Enumerated Example Embodiment 66, further comprising a spatial filter of the test image sequence, located upstream of the disparity estimator.
68. The system of Enumerated Example Embodiment 67, further comprising a spatial filter of the reference image sequence, located upstream of the disparity estimator.
69. The system according to any one of Enumerated Example Embodiments 66 to 68, wherein the disparity estimator comprises a test image sequence disparity estimator and a reference image sequence disparity estimator.
70. The system of Enumerated Example Embodiment 69, wherein the metric calculator computes the consistency of the test image sequence based on a combination between a no-reference metric based on the test image sequence only and a reference metric based on the test image sequence and the reference image sequence.
71. The system according to any one of Enumerated Example Embodiments 66 to 70, wherein the consistency of the test image sequence is computed in one or more domains.
72. The system of Enumerated Example Embodiment 71, wherein the one or more domains comprise one or more of: temporal domain, spatial domain, frequency domain, or brightness domain.
73. The system of Enumerated Example Embodiment 72, wherein the spatial domain comprises a multi-view domain.
74. The system according to any one of Enumerated Example Embodiments 66 to 73, further comprising:
a disparity compensator located downstream of the disparity estimator, to provide predicted images adapted to be used by the metric calculator to compute the consistency of the test image sequence.
75. The system according to any one of Enumerated Example Embodiments 66 to 74, wherein, for each image of the test image sequence, the disparity estimator considers neighboring images of said each image.
76. The system of Enumerated Example Embodiment 75, further comprising a combiner to combine the predicted images referring to a first image of the test image sequence and to calculate predicted images referring to a successive image of the test image sequence also on the basis of the combined predicted images of the first image.
77. The system according to any one of Enumerated Example Embodiments 66 to 76, wherein the metric calculator computes the consistency of the test image sequence with reference to the reference image sequence.
78. The system according to any one of Enumerated Example Embodiments 66 to 77, wherein the metric calculator computes the consistency of the test image sequence based on a comparison between pixels in a selected image of the test image sequence and corresponding pixels of a neighbor image of the selected image.
79. The system of Enumerated Example Embodiment 78, wherein the metric calculator computes the consistency of the test image sequence further based on variation in corresponding pixel values over time.
80. The system of Enumerated Example Embodiment 79, wherein the variation in corresponding pixel values over time includes disparity compensated pixels.
81. The system according to any one of Enumerated Example Embodiments 66 to 80, the system being associated with a system comprising one or more of: a video compression system, a video pre-processing system, a video post-processing system, and a video watermarking system.
82. The system of any one of Enumerated Example Embodiments 66 to 81, wherein the images are in a bitstream mode.
83. The system of any one of Enumerated Example Embodiments 66 to 82, where the images comprise still images.
84. A method for evaluating the quality of a sequence of images, comprising the steps of:
estimating a disparity among images in one or more domains to generate disparity vectors; and
computing a metric based on the disparity vectors to evaluate the quality of the sequence of images.
85. The quality evaluation method as recited in Enumerated Example Embodiment 84 wherein:
the disparity estimation comprises a test sequence disparity estimation performed among images pertaining to a test image sequence and a reference sequence disparity estimation performed among images pertaining to a reference image sequence and wherein the metric is based on the test sequence disparity estimation and the reference sequence disparity estimation; or
the disparity estimation comprises a test sequence disparity estimation performed among images pertaining to a test image sequence and wherein the metric is based, at least in part, on the test sequence disparity estimation; or
the disparity estimation comprises a test sequence disparity estimation performed among images pertaining to a test image sequence and a reference sequence disparity estimation performed among images pertaining to a reference image sequence and the metric based on the disparity estimation comprises a combination of:
a first metric that is based, at least in part, on the test sequence disparity estimation and the reference sequence disparity estimation; and
a second metric based on the test sequence disparity estimation; or
the disparity estimation comprises a test sequence disparity estimation performed among images pertaining to a test image sequence and a reference sequence disparity estimation performed among images pertaining to a reference image sequence and wherein the metric is based, at least in part, on the disparity estimation comprises a combination between a first metric based both on the test sequence disparity estimation and the reference sequence disparity estimation and a second metric based on the test sequence disparity estimation.
86. The quality evaluation method as recited in Enumerated Example Embodiment 85, further comprising one or more of the steps of:
spatially filtering of the test image sequence and the reference image sequence prior to performing disparity estimation of the test image sequence and the reference image sequence; or.
registering the test image sequence and the reference image sequence together prior to performing disparity estimation of the test image sequence and the reference image sequence.
87. The quality evaluation method as recited in Enumerated Example Embodiment 84 wherein the metric based on the disparity estimation is combined with one or more further metrics.
88. The quality evaluation method as recited in Enumerated Example Embodiment 84 wherein the one or more domains comprise one or more of: temporal domain, spatial domain, multi-view domain, or brightness domain.

89. The quality evaluation method as recited in Enumerated Example Embodiment 84, wherein the metric is a metric pooled over a plurality of images in the one or more domains, further comprising performing disparity compensation among the images in the one or more domains, wherein the disparity compensation is based, at least in part, on the disparity estimation and provides image predictions, and wherein the metric is based, at least in part, on at least one of the disparity estimation and the disparity compensation.

90. The quality evaluation method as recited in Enumerated Example Embodiment 84 wherein the disparity estimation among the images comprises considering, for each image, one or more image neighbors of each of the images in the one or more domains.

91. The quality evaluation method as recited in Enumerated Example Embodiment 84 wherein the metric is computed on the basis of:
    the disparity estimation;
    a set of local parameters, configurable region by region or pixel by pixel for each image, and
    a set of global parameters, configurable image by image.

92. The quality evaluation method as recited in Enumerated Example Embodiment 84 wherein the metric is computed over at least one of:
    the entire image; or
    a subset of the entire image.

93. The quality evaluation method as recited in Enumerated Example Embodiment 84 wherein the metric is a metric pooled over a plurality of images in the one or more domains.

94. A system for evaluating a quality of a sequence of images, comprising:
    means for estimating a disparity among images in one or more domains to generate disparity vectors; and
    means for computing a metric based on the disparity vectors to evaluate the quality of the sequence of images.

95. A use for a computer system in evaluating a quality of a sequence of images, the process comprising:
    estimating a disparity among images in one or more domains to generate disparity vectors; and
    computing a metric based on the disparity vectors to evaluate the quality of the sequence of images.

96. An apparatus for evaluating a quality of a sequence of images, comprising:
    at least one processor; and
    a computer readable storage medium that stores encoded instructions, which when executed with the at least one processor, causes, controls, programs, or configures the at least one processor to compute, perform, control, or execute a quality evaluation process over a sequence of images, the process comprising:
    estimating a disparity among images in one or more domains to generate disparity vectors; and
    computing a metric based on the disparity vectors to evaluate the quality of the sequence of images.

97. A computer readable storage medium that stores encoded instructions, which when executed with one or more processors, causes, controls, programs, or configures the one or more processors to compute, perform, control, program, configure or execute one or more of:
    a quality evaluation process over a sequence of images, the process comprising:
    estimating a disparity among images in one or more domains to generate disparity vectors; and
    computing a metric based on the disparity vectors to evaluate the quality of the sequence of images;
    a use for a computer, which comprises performing the quality evaluation process over the sequence of images;
    a system, which comprises means for performing the quality evaluation process over the sequence of images; or
    an apparatus for evaluating the quality of the image sequence.

98. A system for computing consistency of a test image sequence, comprising:
    a disparity estimator, to estimate disparities among images of the test image sequence or disparities between images of the test image sequence and images of a reference image sequence through generation of disparity vectors; and
    a metric calculator, to compute the consistency of the test image sequence as a function of the disparity vectors generated by the disparity estimator.

A number of embodiments of the disclosure have been described. Nevertheless, it will be understood that various modifications may be made without departing from the spirit and scope of the present disclosure. Accordingly, other embodiments are within the scope of the following claims.

List of references

[1] VQEG, "Final Report from the Video Quality Experts Group on the Validation of Objective Models of Video Quality Assessment. Phase I" (March 2000)

[2] VQEG, "Final Report from the Video Quality Experts Group on the Validation of Objective Models of Video Quality Assessment. Phase II" (August 2003)

[3] B. Girod, "What's Wrong with Mean-Squared Error," *Digital Images and Human Vision*, A. B. Watson, ed., pp. 207-220, MIT Press (1993)

[4] A. B. Watson, J. Hu, and J.F. McGowan III, "Digital Video Quality Metric Based on Human Vision," *Journal of Electronic Imaging*, vol. 10, no. 1, pp. 20-29 (2001)

[5] C. J. van den Branden Lambrecht, and O. V. Verscheure, "Perceptual Quality Measure Using a Spatio-Temporal Model of the Human Visual System," *Proc. of SPIE*, vol. 2668, pp. 450-461 (1996)

[6] J. Lubin, M. H. Brill, A. DeVries, and O. Finard, "Method and Apparatus for Assessing the Visibility of Differences Between Two Image Sequences," U.S. Pat. No. 5,974,159 (1999)

[7] ANSI T1.801.03-2003, "American National Standard for Telecommunications—Digital Transport of One-Way Video Signals—Parameters for Objective Performance Assessment" (2003)

[8] A. P. Hekstra, et. al., "PVQM: A Perceptual Video Quality Measure," *Signal Processing: Image Communication*, vol. 17, no. 10, pp. 781-798 (2002)

[9] Z. Wang, A. C. Bovik, and H. R. Sheikh, "Image Quality Assessment: From Error Visibility to Structural Similarity," *IEEE Trans. on Image Processing*, vol. 13, no. 4, pp. 600-612 (2004)

[10] K. Seshadrinathan, and A. C. Bovik, "A Structural Similarity Metric for Video Based on Motion Models," *IEEE Int. Conf on Acoustics Speech and Signal Processing (ICASSP)*, vol. 1, pp. 1-869—I-872 (2007)

[11] Z. Wang, L. Lu, and A. C. Bovik, "Video Quality Assessment Based on Structural Distortion Measurement," *Signal Processing: Image Communication*, vol. 19, no. 2, pp. 121-132 (2004)

[12] A. M. Tourapis, O. C. Au, and M. L. Liou, "Highly Efficient Predictive Zonal Algorithms for Fast Block-Matching Motion Estimation," *IEEE Trans. on Circuits and Systems*, vol. 12, no. 10, pp. 934-947 (2002)

[13] A. M. Tourapis, H.-Y. Cheong, and P. Topiwala, "Fast ME in the J M Reference Software," ISO/IEC JTC1/SC29/WG11 and ITU-T SG16 Q.6, Document JVT-P026 (2005)

[14] H.-Y. C. Tourapis and A. M. Tourapis, "Fast Motion Estimation within the H.264 codec," *Int, Conf on Multimedia and Expo*, vol. 3, pp. 517-520 (2003).

What is claimed is:

1. A method for evaluating the quality of a sequence of test images in relation to a sequence of reference images,
   wherein the sequence of test images comprises a sequence of a number of neighbor images of a certain test image,
   wherein the sequence of reference images comprises a sequence of the same number of neighbor images of a certain reference image,
   the method comprising the steps of:
   for each location of the certain test image and for each neighbor image of the certain test image, estimating a disparity between the certain test image and the neighbor images of the certain test image to generate a test image disparity vector, and for each location of the certain reference image and for each neighbor image of the certain reference image, estimating a disparity between the certain reference image and the neighbor images of the certain reference image to generate a reference image disparity vector, wherein the location comprises at least one of a pixel, a block, or a region of the corresponding image;
   for each location of the certain test image and for each neighbor image of the certain test image, computing a consistency function that depends on the test image disparity vector and the reference image disparity vector; and
   computing a metric based on a weighted combination of the consistency function over the locations of the certain test image and over the neighbor images of the certain test image to evaluate the quality of the sequence of test images at the certain test image,
   wherein the metric is computed:
      by weighting the consistency function at each location of each test image with a local weighting parameter, configurable for each location of each test image, wherein the local weighting parameter for a location of a test image represents the probability that the disparity vectors in the reference and test sequences will be consistent given the consistency of neighboring disparity vectors in the reference sequence, and
      by weighting the consistency function of each test image with a global weighting parameter, configurable image by image, wherein the global weighting parameter for each test image depends on the temporal distance between the test image and its neighbor image, as well as on whether the content of the test image is detected to contain an event which will affect the accuracy of the disparity estimation.

2. The quality evaluation method as recited in claim 1 wherein:
   the consistency function depends on the magnitude of the difference between the test image disparity vector and the reference image disparity vector.

3. The quality evaluation method as recited in claim 2 wherein:
   the consistency function comprises an indicator function that determines either a similarity or a difference between the test image disparity vector and the reference image disparity vector.

4. The quality evaluation method as recited in claim 3 wherein:
   the local parameter depends on the spatial neighborhood of the reference image, and the global parameter depends on the temporal distance between the neighbor image and the certain image.

5. The quality evaluation method as recited in claim 1 wherein:
   the sequence comprises a temporal sequence, and
   the neighbor images comprise past and future neighbor images of the corresponding certain image.

6. The quality evaluation method as recited in claim 5 wherein:
   the images comprise multi-view images,
   the metric, namely the temporal metric of a view, is computed separately for each view of the temporal sequence of test images.

7. The quality evaluation method as recited in claim 6 wherein:
   the sequence of images comprises a plurality of views of the corresponding image at the same time,
   the neighbor images comprise different views of the corresponding certain image, and
   the metric, namely the multi-view metric, is computed between the views of the certain test image.

8. The quality evaluation method as recited in claim 7 further comprising the steps of:
   computing a combined temporal metric by combining the temporal metrics of all views of the temporal sequence, and
   computing a temporal multi-view metric by adding the combined temporal metric and the multi-view metric in a weighted combination.

9. The quality evaluation method as recited in claim 1 wherein the metric based on the disparity estimation is combined with one or more further metrics.

10. The quality evaluation method as recited in claim 1 wherein the disparity estimation among the images comprises considering, for each image, one or more image neighbors of each of the images.

11. The quality evaluation method as recited in claim 1 wherein the metric is computed over at least one of:
    the entire image; or
    a subset of the entire image.

12. The quality evaluation method as recited in claim 1 wherein the metric comprises a metric pooled over a plurality of images.

13. A method for evaluating the quality of a sequence of test images,
    wherein the sequence of test images comprises a sequence of a number of neighbor images of a certain test image,
    the method comprising the steps of:
    estimating a disparity between the certain test image and the neighbor images of the certain test image to generate a prediction image of the certain test image for each neighbor image;
    for each pixel of the certain test image and for each prediction image of the certain test image, measuring a pixel difference between the certain test image and the prediction images of the certain test image;
    computing a metric based on a weighted combination of the measured pixel differences over the pixels of the certain test image and over the prediction images of the certain test image to evaluate the quality of the sequence of test images at the certain test image,
    wherein the metric is computed:
       by weighting the measured pixel differences at each pixel of each test image with a local weighting parameter, configurable for each pixel of each test image, wherein the local weighting parameter for a pixel of a test image represents the probability that the disparity vectors in the prediction images and the test sequence will be consistent given the consistency of neighboring disparity vectors in the prediction images, and by weighting the consistency function of each test image with a global weighting parameter, configurable image by image, wherein the global weighting parameter for each test image depends on the temporal distance between the test image and its neighbor image, as well as on whether the content of the test image is detected to contain an event which will affect the accuracy of the disparity estimation.

14. The quality evaluation method as recited in claim 13 wherein:

the measured pixel difference comprises at least one of the absolute difference of pixel values, or the square of the difference of pixel values.

15. A method for evaluating the quality of a sequence of test images, wherein the sequence of test images comprises a sequence of a number of neighbor images of a certain test image, the method comprising the steps of:

estimating a disparity between the certain test image and the neighbor images of the certain test image to generate a prediction image of the certain test image for each neighbor image;

for each pixel of the certain test image and for each prediction image of the certain test image, measuring a variation in pixel values between the certain test image and the prediction images of the certain test image;

computing a metric based on a weighted combination of the measured variation in pixel values over the pixels of the certain test image and over the prediction images of the certain test image to evaluate the quality of the sequence of test images at the certain test image, wherein the metric is computed by weighting the measured variation in pixel values at each pixel of each test image with a local weighting parameter, configurable for each pixel of each test image, wherein the local weighting parameter for a pixel of a test image represents the probability that the disparity vectors in the prediction images and the test sequence will be consistent given the consistency of neighboring disparity vectors in the prediction images, and by weighting the consistency function of each test image with a global weighting parameter, configurable image by image, wherein the global weighting parameter for each test image depends on the temporal distance between the test image and its neighbor image, as well as on whether the content of the test image is detected to contain an event which will affect the accuracy of the disparity estimation.

16. The quality evaluation method as recited in claim 15 wherein:

the measured variation in pixel values comprises a distance metric that depends on the weighted mean of pixel values over the prediction images of the certain test image.

17. A system for evaluating a quality of a sequence of images in relation to a sequence of reference images, wherein the sequence of test images comprises a sequence of a number of neighbor images of a certain test image, wherein the sequence of reference images comprises a sequence of the same number of neighbor images of a certain reference image, the system comprising:

for each location of the certain test image and for each neighbor image of the certain test image, means for estimating a disparity between the certain test image and the neighbor images of the certain test image to generate a test image disparity vector, and for each location of the certain reference image and for each neighbor image of the certain reference image, means for estimating a disparity between the certain reference image and the neighbor images of the certain reference image to generate a reference image disparity vector, wherein the location comprises at least one of a pixel, a block, or a region of the corresponding image;

for each location of the certain test image and for each neighbor image of the certain test image, means for computing a consistency function that depends on the test image disparity vector and the reference image disparity vector; and means for computing a metric based on a weighted combination of the consistency function over the locations of the certain test image and over the neighbor images of the certain test image to evaluate the quality of the sequence of test images at the certain test image, wherein the metric computing means comprises:

means for weighting the consistency function at each location of each test image with a local weighting parameter, configurable for each location of each test image, wherein the local weighting parameter for a location of a test image represents the probability that the disparity vectors in the reference and test sequences will be consistent given the consistency of neighboring disparity vectors in the reference sequence, and means for weighting the consistency function of each test image with a global weighting parameter, configurable image by image, wherein the global weighting parameter for each test image depends on the temporal distance between the test image and its neighbor image, as well as on whether the content of the test image is detected to contain an event which will affect the accuracy of the disparity estimation.

18. An apparatus for evaluating a quality of a sequence of images in relation to a sequence of reference images, wherein the sequence of test images comprises a sequence of a number of neighbor images of a certain test image, wherein the sequence of reference images comprises a sequence of the same number of neighbor images of a certain reference image, the apparatus comprising:

at least one processor; and a computer readable storage medium comprising encoded instructions stored tangibly therewith, wherein the encoded instructions, when executed by the processor, cause, program, or control the processor to allow, configure or control the apparatus to perform a process, which comprises the steps of:

for each location of the certain test image and for each neighbor image of the certain test image, estimating a disparity between the certain test image and the neighbor images of the certain test image to generate a test image disparity vector, and for each location of the certain reference image and for each neighbor image of the certain reference image, estimating a disparity between the certain reference image and the neighbor images of the certain reference image to generate a reference image disparity vector, wherein the location comprises at least one of a pixel, a block, or a region of the corresponding image;

for each location of the certain test image and for each neighbor image of the certain test image, computing a consistency function that depends on the test image disparity vector and the reference image disparity vector; and computing a metric based on a weighted combination of the consistency function over the locations of the certain test image and over the neighbor images of the certain test image to evaluate the quality of the sequence of test images at the certain test image, wherein the metric is computed:

by weighting the consistency function at each location of each test image with a local weighting parameter, configurable for each location of each test image, wherein the local weighting parameter for a location of a test image represents the probability that the disparity vectors in the reference and test sequences will be consistent given the consistency of neighboring disparity vectors in the reference sequence, and by weighting the consistency function of each test image with a global weighting parameter, configurable image by image, wherein the global weighting parameter for each test image depends on the temporal distance between the test image and its neighbor image, as well as on whether the content of the test image is detected to contain an event which will affect the accuracy of the disparity estimation.

19. A non-transitory computer readable storage medium that tangibly stores encoded instructions, which when executed with one or more processors, causes, programs or controls the one or more processors to execute a process for evaluating a quality of a sequence of images in relation to a sequence of reference images, wherein the sequence of test images comprises a sequence of a number of neighbor images of a certain test image, wherein the sequence of reference images comprises a sequence of the same number of neighbor images of a certain reference image, wherein the process comprising the steps of:

for each location of the certain test image and for each neighbor image of the certain test image, estimating a disparity between the certain test image and the neighbor images of the certain test image to generate a test image disparity vector, and for each location of the certain reference image and for each neighbor image of the certain reference image, estimating a disparity between the certain reference image and the neighbor images of the certain reference image to generate a reference image disparity vector, wherein the location comprises at least one of a pixel, a block, or a region of the corresponding image;

for each location of the certain test image and for each neighbor image of the certain test image, computing a consistency function that depends on the test image disparity vector and the reference image disparity vector; and computing a metric based on a weighted combination of the consistency function over the locations of the certain test image and over the neighbor images of the certain test image to evaluate the quality of the sequence of test images at the certain test image, wherein the metric is computed:

by weighting the consistency function at each location of each test image with a local weighting parameter, configurable for each location of each test image, wherein the local weighting parameter for a location of a test image represents the probability that the disparity vectors in the reference and test sequences will be consistent given the consistency of neighboring disparity vectors in the reference sequence, and by weighting the consistency function of each test image with a global weighting parameter, configurable image by image, wherein the global weighting parameter for each test image depends on the temporal distance between the test image and its neighbor image, as well as on whether the content of the test image is detected to contain an event which will affect the accuracy of the disparity estimation.

* * * * *